United States Patent
Shin et al.

(10) Patent No.: US 9,842,400 B2
(45) Date of Patent: Dec. 12, 2017

(54) METHOD AND APPARATUS FOR DETERMINING DISPARITY

(71) Applicant: SAMSUNG ELECTRONICS CO., LTD., Suwon-si (KR)

(72) Inventors: Changwoo Shin, Hwaseong-si (KR); Kyoobin Lee, Seoul (KR); Jun Haeng Lee, Hwaseong-si (KR); Eric Hyunsurk Ryu, Hwaseong-si (KR); Jooyeon Woo, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 79 days.

(21) Appl. No.: 14/835,078

(22) Filed: Aug. 25, 2015

(65) Prior Publication Data
US 2016/0217584 A1    Jul. 28, 2016

(30) Foreign Application Priority Data
Jan. 27, 2015    (KR) .................. 10-2015-0012732

(51) Int. Cl.
*G06K 9/00*    (2006.01)
*G06T 7/00*    (2017.01)
(Continued)

(52) U.S. Cl.
CPC ............ *G06T 7/0075* (2013.01); *G06T 7/292* (2017.01); *G06T 7/571* (2017.01); *G06T 7/593* (2017.01);
(Continued)

(58) Field of Classification Search
CPC ....... G06T 2200/28; G06T 2207/10012; G06T 2207/10016; G06T 7/0075; G06T 7/292;
(Continued)

(56) References Cited

U.S. PATENT DOCUMENTS 5,867,591 A    2/1999    Onda
6,556,704 B1    4/2003    Chen
(Continued)

FOREIGN PATENT DOCUMENTS

JP    5036132 B2    9/2012
KR    10-0392381 B1    7/2003
(Continued)

OTHER PUBLICATIONS

Kogler, et al., "Event-Based Stereo Matching Approaches for Frameless Address Event Stereo Data", Advances in Visual Computing, Sep. 26, 2011, pp. 674-685, XP 019166064.
(Continued)

*Primary Examiner* — Nirav G Patel
(74) *Attorney, Agent, or Firm* — Sughrue Mion, PLLC

(57) ABSTRACT

A disparity determination method and apparatus are provided. The disparity determination method includes receiving first signals of an event from a first sensor disposed at a first location and second signals of the event from a second sensor disposed at a second location that is different than the first location, and extracting a movement direction of the event, based on at least one among the first signals and the second signals. The disparity determination method further includes determining a disparity between the first sensor and the second sensor, based on the movement direction, a difference between times at which the event is sensed by corresponding pixels in the first sensor, and a difference between times at which the event is sensed by corresponding pixels in the first sensor and the second sensor.

30 Claims, 20 Drawing Sheets

(51) Int. Cl.
  *H04N 13/00* (2006.01)
  *G06T 7/70* (2017.01)
  *G06T 7/571* (2017.01)
  *G06T 7/593* (2017.01)
  *G06T 7/292* (2017.01)

(52) U.S. Cl.
  CPC ............ *G06T 7/70* (2017.01); *H04N 13/0022* (2013.01); *H04N 13/0037* (2013.01); *G06T 2200/28* (2013.01); *G06T 2207/10012* (2013.01); *G06T 2207/10016* (2013.01); *H04N 2013/0077* (2013.01); *H04N 2013/0081* (2013.01); *H04N 2013/0085* (2013.01)

(58) Field of Classification Search
  CPC ............ G06T 7/571; G06T 7/593; G06T 7/70; H04N 13/0022; H04N 13/0037; H04N 2013/0077; H04N 2013/0081; H04N 2013/0085
  See application file for complete search history.

(56) References Cited

U.S. PATENT DOCUMENTS

| | | | |
|---|---|---|---|
| 7,692,551 B2 | 4/2010 | Bonefas et al. | |
| 8,090,195 B2 | 1/2012 | Oyama | |
| 8,260,040 B2 | 9/2012 | Woodfill et al. | |
| 8,488,870 B2 | 7/2013 | Martinez-Bauza et al. | |
| 2012/0307017 A1 | 12/2012 | Lievens et al. | |
| 2013/0335595 A1 | 12/2013 | Lee et al. | |
| 2014/0320706 A1 | 10/2014 | Shin et al. | |
| 2015/0030204 A1 | 1/2015 | Lee et al. | |
| 2016/0086322 A1* | 3/2016 | Arita | E01B 35/02 382/154 |

FOREIGN PATENT DOCUMENTS

| | | |
|---|---|---|
| KR | 10-0776649 B1 | 11/2007 |
| KR | 10-0926287 B1 | 11/2009 |
| KR | 10-0951637 B1 | 4/2010 |
| KR | 10-1265021 B1 | 5/2013 |
| KR | 10-1276720 B1 | 6/2013 |
| KR | 10-1345303 B1 | 12/2013 |

OTHER PUBLICATIONS

Camuñas-Mesa, et al., "On the use of orientation filters for 3D reconstruction in event-driven stereo vision", Frontiers in Neuroscience, vol. 8, Article 48, Mar. 31, 2014, pp. 1-17, XP 055277989.

Schraml, et al., "Event-Driven Stereo Matching for Real-Time 3D Panoramic Vision", IEEE Conference on Computer Vision and Pattern Recognition (CVPR), IEEE, Jun. 7, 2015, pp. 466-474, XP 032793476.

Firouzi, et al., "Asynchronous Event-based Cooperative Stereo Matching Using Neuromorphic Silicon Retinas", Neural Process Letters, vol. 43, Issue No. 2, May 26, 2015, pp. 311-326, XP 055277997.

Communication dated Jun. 15, 2016, issued by the European Patent Office in counterpart European Patent Application No. 15190972.8.

* cited by examiner

METHOD AND APPARATUS FOR DETERMINING DISPARITY

CROSS-REFERENCE TO RELATED APPLICATION

This application claims priority from Korean Patent Application No. 10-2015-0012732, filed on Jan. 27, 2015, in the Korean Intellectual Property Office, the disclosure of which is incorporated herein by reference in its entirety.

BACKGROUND

1. Field

Methods and apparatuses consistent with exemplary embodiments relate to determining a disparity or a depth.

2. Description of the Related Art

Stereo matching is a technology of obtaining depth information from images acquired using two cameras. Due to a difference between locations of the two cameras, the same object in two images appears in different locations. A disparity between points focused on sensing planes of the two cameras may be expressed by a function of a focal distance between the two cameras, a distance between the two cameras, a size of a sensing pixel, and a distance to a target object. Based on the above property, whether corresponding pixels between images are similar to each other may be determined and accordingly, it is possible to acquire depth information to an object in an image based on a result of the determining.

However, the above determining has a high complexity of calculation. In addition, a resolution of depth information acquired based on a disparity corresponding to a unit of a pixel size is limited.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a disparity determination method including receiving first signals of an event from a first sensor disposed at a first location and second signals of the event from a second sensor disposed at a second location that is different than the first location, and extracting a movement direction of the event, based on at least one among the first signals and the second signals. The method further includes determining a disparity between the first sensor and the second sensor, based on the movement direction, a difference between times at which the event is sensed by corresponding pixels in the first sensor, and a difference between times at which the event is sensed by corresponding pixels in the first sensor and the second sensor.

A resolution of the disparity may be less than a size of pixels in each of the first sensor and the second sensor.

The corresponding pixels in the first sensor may sense the event corresponding to a point of an object at different times.

The disparity determination method may further include setting, as the corresponding pixels in the first sensor, a first pixel and a second pixel in the first sensor that sense the event, based on the movement direction.

The extracting may include comparing a time of an element corresponding to one of the first signals to a time of another element neighboring the element in an event map of the first sensor, and extracting the movement direction based on a result of the comparing.

The corresponding pixels in the first sensor and the second sensor may sense the event corresponding to a point of an object at different times.

The disparity determination method may further include setting, as the corresponding pixels in the first sensor and the second sensor, a first pixel in the first sensor and a second pixel in the second sensor that sense the event, based on the movement direction, an arrangement of pixels in each of the first sensor and the second sensor, and the disparity having a resolution equal to a size of the pixels in each of the first sensor and the second sensor.

The disparity determination method may further include determining whether the movement direction is matched to a virtual direction from the second location of the second sensor to the first location of the first sensor, and setting pixels corresponding to a same coordinate in the first sensor and the second sensor as the corresponding pixels in the first sensor and the second sensor, in response to the determining that the movement direction is matched to the virtual direction.

A resolution of the disparity may be equal to a size of pixels in each of the first sensor and the second sensor.

The determining may include calculating an acceleration of the event, based on a difference between times at which the event is sensed by neighboring pixels in the first sensor, and a difference between times at which the event is sensed by neighboring pixels in the second sensor, and determining the disparity, based on the acceleration, the difference between the times at which the event is sensed by the corresponding pixels in the first sensor, and the difference between the times at which the event is sensed by the corresponding pixels in the first sensor and the second sensor.

The event may include an event in which a same change of light incident on the first sensor is previously detected by the second sensor.

The disparity determination method may further include performing stereo matching between a first image generated based on the first signals and a second image generated based on the second signals, to generate the disparity having a resolution equal to a size of pixels in each of the first sensor and the second sensor.

The determining may include calculating the difference between the times at which the event is sensed by the corresponding pixels in the first sensor, based on a first event map of the first sensor, and calculating the difference between the times at which the event is sensed by the corresponding pixels in the first sensor and the second sensor, based on the first event map and a second event map of the second sensor.

The disparity determination method may further include updating times of first elements corresponding to the first signals in a first event map of the first sensor, in response to the receiving the first signals, and updating times of second elements corresponding to the second signals in a second event map of the second sensor, in response to the receiving the second signals.

A non-transitory computer-readable storage medium may store a program including instructions to cause a computer to implement the method.

According to an aspect of another exemplary embodiment, there is provided a disparity determination apparatus including an extractor configured to receive first signals of an event from a first sensor disposed at a first location and second signals of the event from a second sensor disposed at a second location that is different than the first location, and extract a movement direction of the event, based on at least one among the first signals and the second signals. The disparity determination apparatus further includes a processor configured to determine a disparity between the first sensor and the second sensor, based on the movement direction, a difference between times at which the event is sensed by corresponding pixels in the first sensor, and a difference between times at which the event is sensed by corresponding pixels in the first sensor and the second sensor.

At least one among the first sensor and the second sensor may include an event-based vision sensor configured to sense the event based on a change in incident light, and output an event signal of the sensed event.

At least one among the first sensor and the second sensor may include an event-based vision sensor including pixels, each of the pixels configured to sense a movement, and output an event signal of the sensed movement.

At least one among the first sensor and the second sensor may include a frame-based vision sensor configured to capture consecutive images for each frame, and an output module configured to sense an event based on a difference between the consecutive images, and output an event signal of the sensed event.

The extractor may be further configured to receive third signals of the event from a third sensor disposed at a third location that is different than the first location and the second location, and extract the movement direction, based on at least one among the first signals, the second signals, and the third signals. The processor may be further configured to determine the disparity, based on a difference between times at which the event is sensed by corresponding pixels in the first sensor and the third sensor, the difference between the times at which the event is sensed by the corresponding pixels in the first sensor, and the difference between the times at which the event is sensed by the corresponding pixels in the first sensor and the second sensor.

The disparity determination apparatus may further include a light emitter configured to project a moving light pattern.

The disparity determination apparatus may further include a setter configured to set, as the corresponding pixels in the first sensor, a first pixel and a second pixel in the first sensor that sense the event, based on the movement direction.

The extractor may be further configured to compare a time of an element corresponding to one of the first signals to a time of another element neighboring the element in an event map of the first sensor, and extract the movement direction based on a result of the comparison.

The disparity determination apparatus may further include a setter configured to set, as the corresponding pixels in the first sensor and the second sensor, a first pixel in the first sensor and a second pixel in the second sensor that sense the event, based on the movement direction, an arrangement of pixels in each of the first sensor and the second sensor, and the disparity having a resolution equal to a size of the pixels in each of the first sensor and the second sensor.

The disparity determination apparatus may further include a determiner configured to determine whether the movement direction is matched to a virtual direction from the second location of the second sensor to the first location of the first sensor, and a setter configured to set pixels corresponding to a same coordinate in the first sensor and the second sensor as the corresponding pixels in the first sensor and the second sensor, in response to the determiner determining that the movement direction is matched to the virtual direction.

The processor may be further configured to calculate an acceleration of the event, based on a difference between times at which the event is sensed by neighboring pixels in the first sensor, and a difference between times at which the event is sensed by neighboring pixels in the second sensor, and determine the disparity, based on the acceleration, the difference between the times at which the event is sensed by the corresponding pixels in the first sensor, and the difference between the times at which the event is sensed by the corresponding pixels in the first sensor and the second sensor.

The disparity determination apparatus may further include a matcher configured to perform stereo matching between a first image generated based on the first signals and a second image generated based on the second signals, to generate the disparity having a resolution equal to a size of pixels in each of the first sensor and the second sensor.

The processor may be further configured to calculate the difference between the times at which the event is sensed by the corresponding pixels in the first sensor, based on a first event map of the first sensor, and calculate the difference between the times at which the event is sensed by the corresponding pixels in the first sensor and the second sensor, based on the first event map and a second event map of the second sensor.

The disparity determination apparatus may further include an updater configured to update times of first elements corresponding to the first signals in a first event map of the first sensor, in response to the extractor receiving the first signals, and update times of second elements corresponding to the second signals in a second event map of the second sensor, in response to the extractor receiving the second signals.

According to an aspect of another exemplary embodiment, there is provided a disparity determination method including receiving a first signal of an event from a first pixel of a first sensor, and determining a movement direction of the event, based on the first signal. The disparity determination method further includes determining a disparity between the first sensor and a second sensor, based on a first time at which the event is sensed by the first pixel, a second time at which the event is sensed by a second pixel of the first sensor that precedes the first pixel in a direction opposite to the movement direction, and a third time at which the event is sensed by a third pixel of the second sensor that has a coordinate equal to a coordinate of the first pixel.

In response to the first sensor being a right sensor, and the determining the movement direction to be a right direction, the determining the disparity may include subtracting, from the first time, the second time at which the event is sensed by the second pixel that precedes the first pixel in a left direction, to generate a first difference, subtracting, from the first time, the third time, to generate a second difference, and dividing the second difference by the first difference, to determine the disparity.

In response to the first sensor being a left sensor, and the determining the movement direction to be a left direction, the determining the disparity may include subtracting, from the first time, the second time at which the event is sensed by the second pixel that precedes the first pixel in a right direction, to generate a first difference, subtracting, from the first time, the third time, to generate a second difference, and dividing the second difference by the first difference, to determine the disparity.

In response to the first sensor being a left sensor, and the determining the movement direction to be a right direction, the determining the disparity may include subtracting, from the first time, the second time at which the event is sensed by the second pixel that precedes the first pixel in a left direction, to generate a first difference, subtracting, from the third time, the second time, to generate a second difference, and dividing the second difference by the first difference, to determine the disparity.

In response to the first sensor being a right sensor, and the determining the movement direction to be a left direction, the determining the disparity may include subtracting, from the first time, the second time at which the event is sensed by the second pixel that precedes the first pixel in a right direction, to generate a first difference, subtracting, from the third time, the second time, to generate a second difference, and dividing the second difference by the first difference, to determine the disparity.

BRIEF DESCRIPTION OF THE DRAWINGS

The above and/or other aspects will be more apparent by describing certain exemplary embodiments with reference to the accompanying drawings in which.

DETAILED DESCRIPTION OF THE EXEMPLARY EMBODIMENTS

Figure 1:
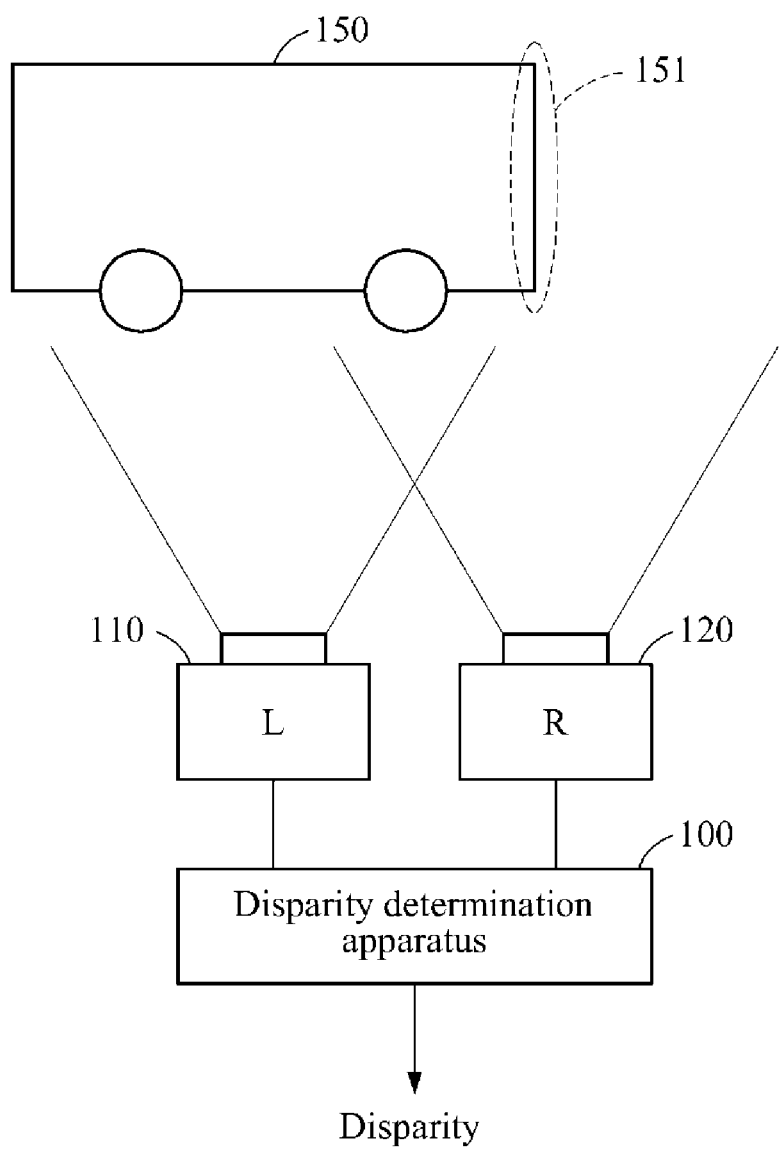
FIG. 1 is a diagram illustrating a disparity determination apparatus according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In addition, the terms such as "unit", "-er (-or)", and "module" described in the specification refer to an element for performing at least one function or operation, and may be implemented in hardware, software, or the combination of hardware and software.

Exemplary embodiments to be described below may be used to measure a depth of a target object. A disparity determination apparatus according to exemplary embodiments may be implemented as various products, for example, a personal computer (PC), a laptop computer, a tablet computer, a smartphone, a television (TV), a smart home appliance, an intelligent vehicle, a kiosk, and a wearable apparatus.

FIG. 1 is a diagram illustrating a disparity determination apparatus 100 according to an exemplary embodiment. Referring to FIG. 1, the disparity determination apparatus 100 determines a disparity associated with a target object 150 based on output signals of a plurality of sensors, for example, a left sensor 110 and a right sensor 120. The disparity determination apparatus 100 may determine the disparity based on a result obtained by the left sensor 110 sensing the target object 150 and a result obtained by the right sensor 120 sensing the target object 150. Each of the sensors may sense an event caused by the target object 150, and may output an event signal in response to the event being sensed, which will be further described below. A result obtained by the sensor sensing the target object 150 may be referred to as a result obtained by the sensor sensing an event caused by the target object 150, or an event signal output from the sensor. The event may include an event in which a same change of light incident on the right sensor 120 is previously detected by the left sensor 110.

Figure 2:
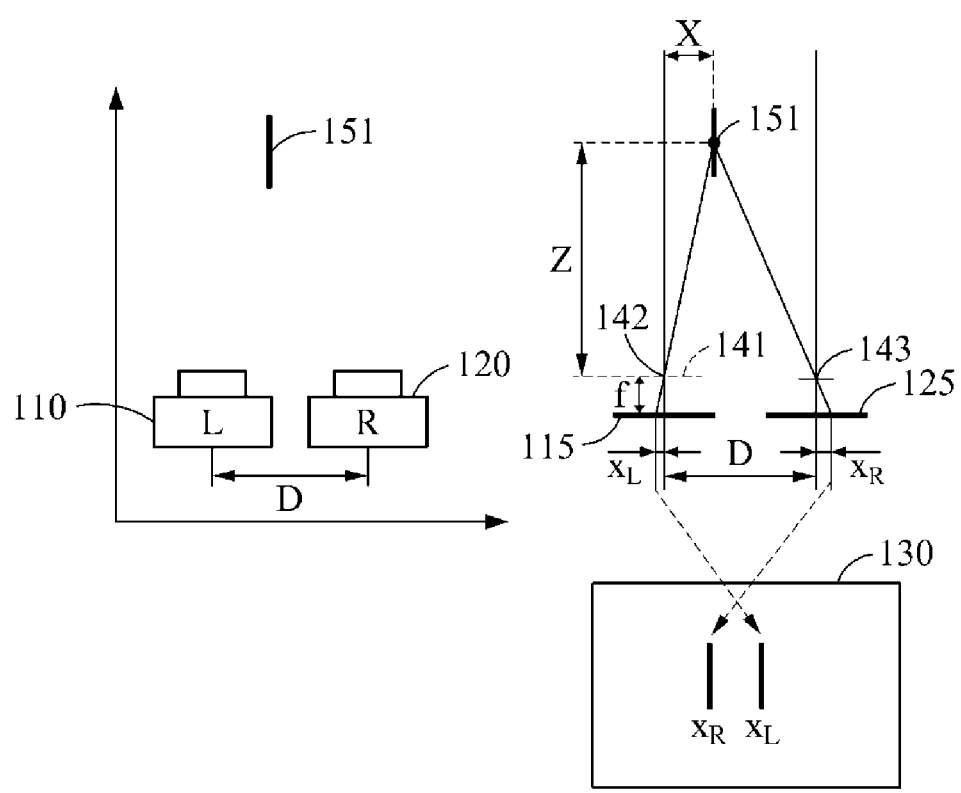
FIG. 2 is a diagram illustrating a method of determining a depth and a disparity according to an exemplary embodiment.

The left sensor 110 and the right sensor 120 sense the target object 150 at different locations as shown in FIG. 2.

FIG. 2 is a diagram illustrating a method of determining a depth and a disparity according to an exemplary embodiment. Referring to FIG. 2, the left sensor 110 and the right sensor 120 are spaced apart from each other by a distance D. In the following description, for convenience of description, a direction in which the left sensor 110 and the right sensor 120 are disposed may be referred to as an x-axis direction. Additionally, a direction from a sensing plane 115 of the left sensor 110 and/or a sensing plane 125 of the right sensor 120 to the target object 150 may be referred to as a z-axis direction. The sensing plane 115 and the sensing plane 125 may be hereinafter referred to as the left sensing plane 115 and the right sensing plane 125.

When the left sensor 110 and the right sensor 120 sense one side 151 of the target object 150, light propagated from the side 151 reach the left sensing plane 115 by passing through a focal point 142 of the left sensor 110, and reach the right sensing plane 125 by passing through a focal point 143 of the right sensor 120.

A point at which the light reaches the left sensing plane 115 may be calculated as shown in Equation 1 below.

$$x_L = \frac{f}{z}X \qquad \text{[Equation 1]}$$

In Equation 1, $x_L$, denotes a distance of the x-axis direction from a central axis of the left sensing plane 115 to the point at which the light reaches the left sensing plane 115, f denotes a focal distance of the left sensor 110, and Z denotes a depth of the target object 150. Z is a distance from a focal plane 141 of the left sensor 110 to the target object 150. The focal plane 141 is a plane passing through the focal point 142 and parallel to the left sensing plane 115. X denotes a distance of the x-axis direction from the central axis of the left sensing plane 115 to the side 151 of the target object 150.

A point at which light reaches the right sensing plane 125 may be calculated as shown in Equation 2 below.

$$x_R = \frac{f}{Z}(X - D) \quad \text{[Equation 2]}$$

In Equation 2, $x_R$ denotes a distance of the x-axis direction from a central axis of the right sensing plane 125 to the point at which the light reaches the right sensing plane 125, and f denotes a focal distance of the right sensor 120. For example, the focal distance of the right sensor 120 may be the same as the focal distance of the left sensor 110. In this example, the focal plane 141 of the left sensor 110 may be the same as a focal plane of the right sensor 120. Z denotes the depth of the target object 150, D denotes a distance between the left sensor 110 and the right sensor 120, and (X−D) denotes a distance of the x-axis direction from the central axis of the right sensing plane 125 to the side 151 of the target object 150.

Equation 3 may be derived from Equations 1 and 2 below.

$$Z = \frac{fD}{x_L - x_R} = \frac{fD}{d} \quad \text{[Equation 3]}$$

In Equation 3, d denotes a disparity of the target object 150. The disparity determination apparatus 100 may calculate the depth Z from the disparity d using Equation 3.

The disparity determination apparatus 100 may more precisely determine the disparity d in comparison to stereo matching schemes. For example, in stereo matching schemes, a disparity corresponding to (i.e., having a resolution of) a unit of a pixel size may be determined, whereas the disparity determination apparatus 100 may determine a disparity (hereinafter, referred to as a "precise disparity") corresponding to a unit smaller than a unit of a pixel size. The disparity corresponding to the unit of the pixel size may be represented by an integer number corresponding to a number of pixels, whereas the precise disparity may be represented by a real number.

The disparity d appears on a virtual plane 130. The virtual plane 130 may refer to a composite sensing plane including the left and right sensing planes 115 and 125. For example, the virtual plane 130 may be obtained by overlapping the left sensing plane 115 and the right sensing plane 125.

Figure 3:
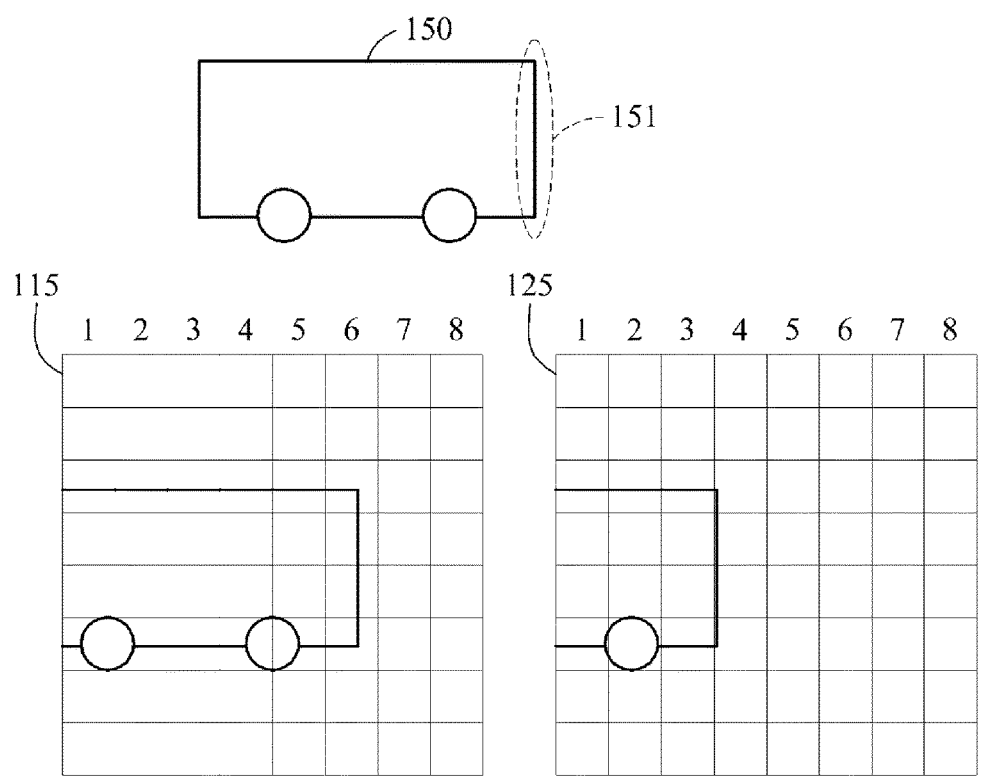
FIGS. 3 and 4 are diagrams illustrating a precise disparity according to an exemplary embodiment.
Figure 4:
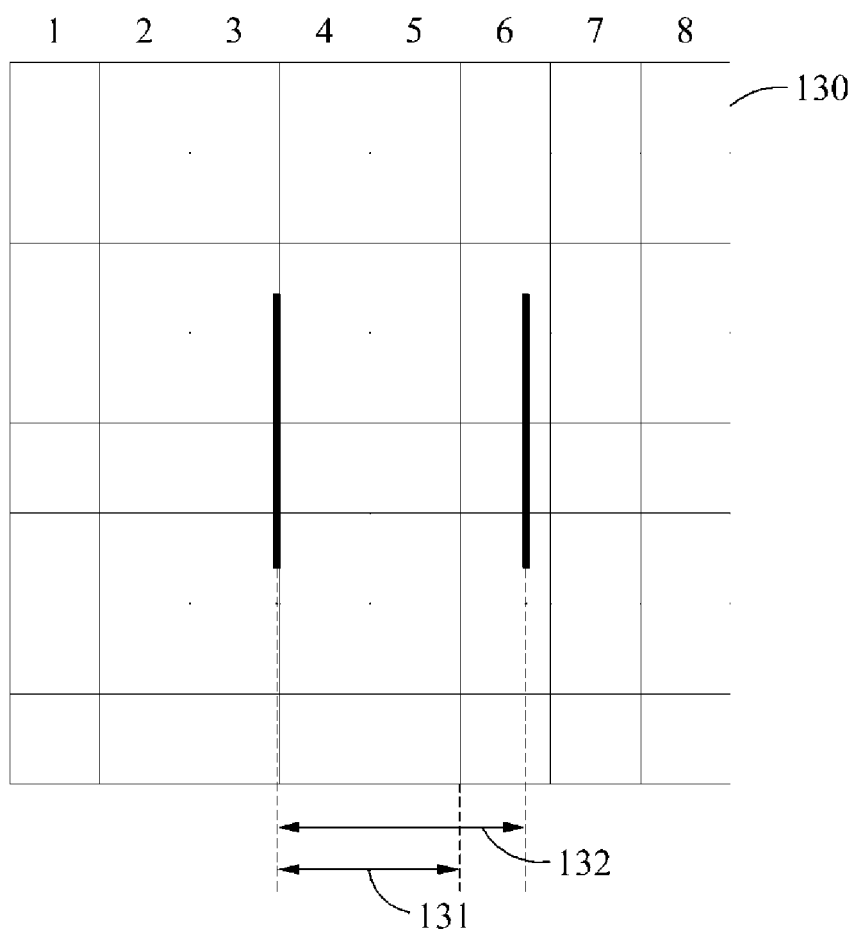

FIGS. 3 and 4 are diagrams illustrating a precise disparity according to an exemplary embodiment. Referring to FIG. 3, each of the left sensing plane 115 and the right sensing plane 125 includes a plurality of pixels. For example, an x-coordinate of each of pixels that are included in the left sensing plane 115 and that sense the side 151 is "6," and an x-coordinate of each of pixels that are included in the right sensing plane 125 and that sense the side 151 is "4." In this example, a disparity may be determined as two pixels using stereo matching schemes.

Conversely, referring to FIG. 4, the disparity determination apparatus 100 determines a precise disparity 132. Because the precise disparity 132 is more precise than a disparity 131 corresponding to a unit of a pixel size, the disparity determination apparatus 100 may enhance a degree of precision of a depth.

Figure 5:
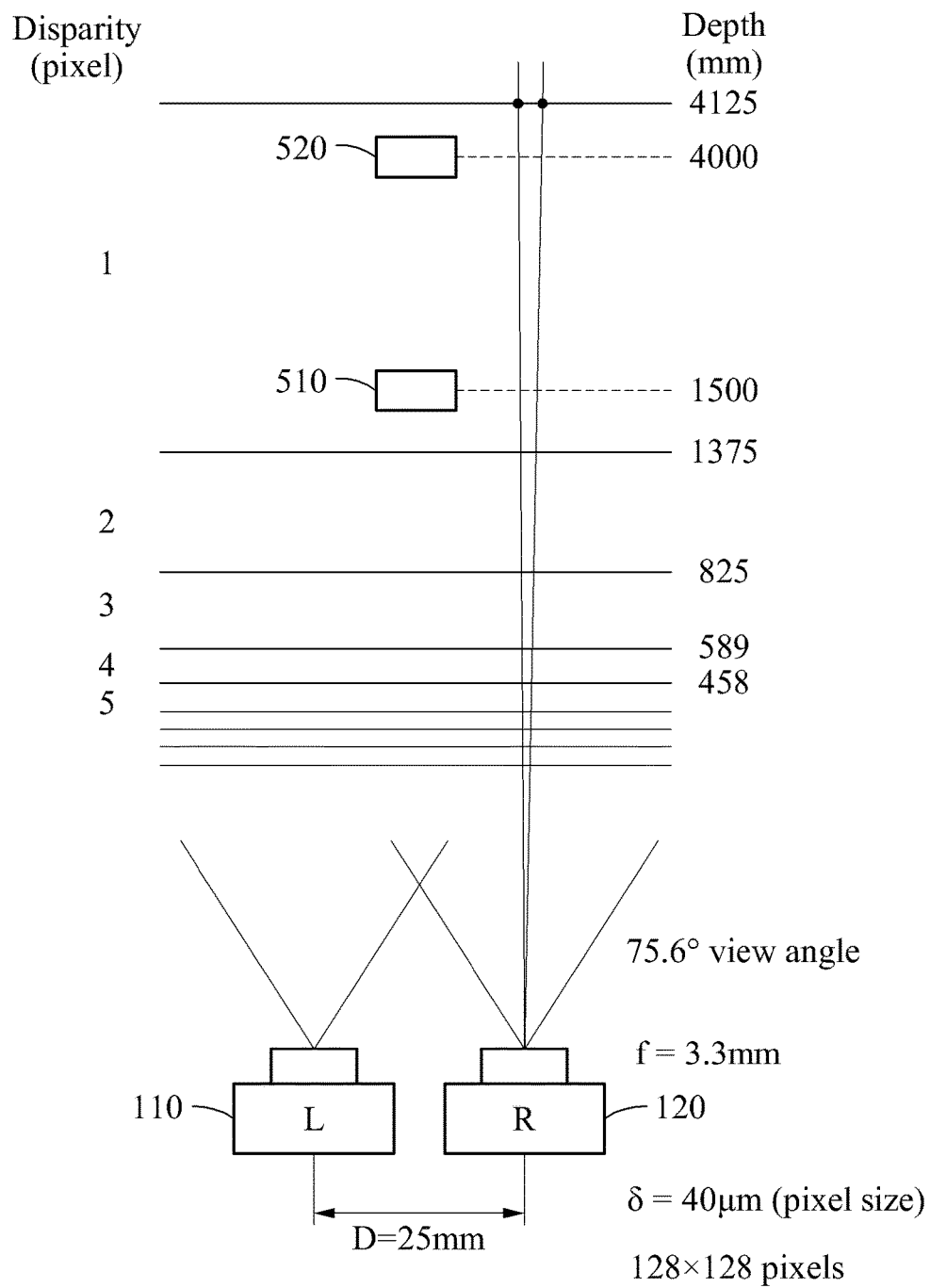
FIG. 5 is a diagram illustrating an influence of an error caused by a disparity corresponding to a unit of a pixel size on a depth resolution according to an exemplary embodiment.

Also, by determining a precise disparity, the disparity determination apparatus 100 may precisely calculate a depth of a target object located too far for a disparity in a unit of a pixel size to be distinguished, as shown in FIG. 5.

FIG. 5 is a diagram illustrating an influence of an error caused by a disparity corresponding to a unit of a pixel size on a depth resolution according to an exemplary embodiment. Referring to FIG. 5, when a depth of a target object increases, an influence of an error caused by a disparity corresponding to a unit of a pixel size on a depth resolution may exponentially increase.

The depth resolution may be calculated using Equation 4 as shown below. Equation 4 may be obtained by partially differentiating Equation 3 and substituting the disparity d for (fD/Z).

$$\partial Z = \frac{D}{d}\partial f + \frac{f}{d}\partial D - \frac{fD}{d^2}\partial d = \frac{Z}{f}\partial f + \frac{Z}{D}\partial D - \frac{Z^2}{fD}\partial d \quad \text{[Equation 4]}$$

∂d in the rightmost term of Equation 4 denotes a size of a unit of a disparity.

For example, when a disparity corresponding to a unit of a pixel size is used, ∂d may denote a size of a single pixel. In this example, ∂Z denote a depth range discriminable based on a disparity corresponding to the size of the single pixel. Due to ∂d in the rightmost term, ∂Z increase in proportion to $Z^2$.

For example, referring to FIG. 5, the distance D between the left sensor 110 and the right sensor 120 is 25 millimeters (mm), a view angle of each of the left sensor 110 and the right sensor 120 is 75.6 degrees, and a focal distance of each of the left sensor 110 and the right sensor 120 is 3.3 mm. In addition, each of the left sensor 110 and the right sensor 120 includes "128×128" pixels, and each pixel has a size δ of 40 micrometers (μm). In this example, a relationship between the disparity d and the depth Z is calculated as shown in FIG. 5.

When a disparity of a target object corresponds to four pixels, a depth of the target object may have a value between 458 mm and 589 mm. When the disparity of the target object corresponds to one pixel, the depth of the target object may have a value between 1375 mm and 4125 mm. Accordingly, when the depth of the target object increases, a depth range discriminable based on a disparity corresponding to a size of a single pixel may exponentially increase. For example, when the depth is determined based on only a disparity corresponding to a unit of a pixel size, a first object 510 with a depth of 1500 mm and a second object 520 with a depth of 4000 mm may be determined to be located at the same depth.

As described above with reference to FIG. 4, the disparity determination apparatus 100 may determine a precise disparity and accordingly, it is possible to precisely calculate a depth of a target object located too far for a disparity in a unit of a pixel size to be distinguished. For example, the disparity determination apparatus 100 may determine a disparity of the first object 510 as 1.375 pixels, and a disparity of the second object 520 as 0.5156 pixels. Thus, the disparity determination apparatus 100 may precisely determine the disparity (or depth) of the first object 510 and the disparity (or depth) of the second object 520.

In addition, when the disparity determination apparatus 100 determines the precise disparity, the left sensor 110 and the right sensor 120 may be located close enough to each other in a product. When a disparity corresponding to a unit of a pixel size is used, it may be difficult to determine the depth Z, because the disparity d decreases as the distance D between the left sensor 110 and the right sensor 120 decreases. When the precise disparity is used, the depth Z may be determined despite a reduction in the disparity d and accordingly, the left sensor 110 and the right sensor 120 may be located close enough to each other in the product. Thus, the disparity determination apparatus 100 may provide a technology that reduces a form factor of the product. In addition, when the left sensor 110 and the right sensor 120 are located close enough to each other in the product, an occlusion phenomenon may be mitigated. Hereinafter, a method of determining a precise disparity will be further described.

Figure 6:
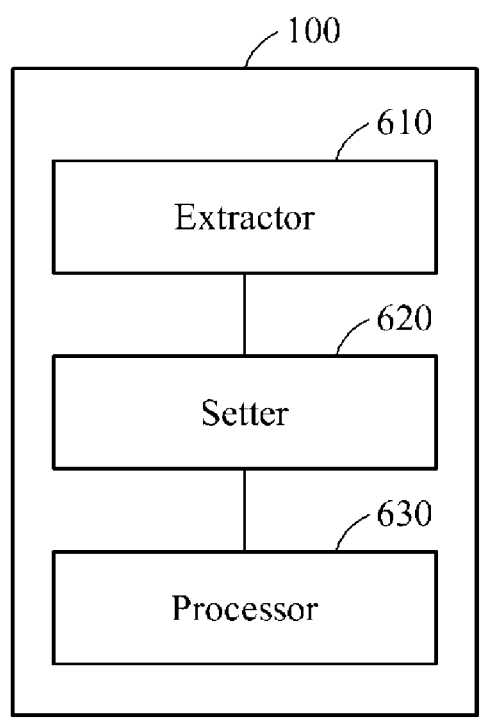
FIG. 6 is a block diagram illustrating a configuration of the disparity determination apparatus of FIG. 1.

FIG. 6 is a block diagram illustrating a configuration of the disparity determination apparatus 100 of FIG. 1. Referring to FIG. 6, the disparity determination apparatus 100 includes an extractor 610, a setter 620, and a processor 630. Each of the extractor 610, the setter 620 and the processor 630 may be implemented as a software module, a hardware module, or a combination thereof.

The extractor 610 receives an output signal of a first sensor and/or an output signal of a second sensor. The first sensor and the second sensor sense an event in different locations. The event may refer to a phenomenon in which an amount of light incident on a pixel of a sensor changes. Also, the event may refer to a movement of a subject that allows an amount of light incident on a pixel of a sensor to change, a movement of a sensor that allows an amount of light incident on a pixel of the sensor to change, or a change in a lighting that allows an amount of light incident on a pixel of a sensor to change. According to an exemplary embodiment, the event may include a consecutive event. For example, the event may be an event in which light incident on the first sensor and the second sensor consecutively changes.

Sensing an event may indicate sensing a change in an amount of light incident on a sensor. The sensor may output an event signal in response to the event being sensed. For example, the sensor may output an event signal using a pixel sensing the change in the amount of light incident on the sensor among a plurality of pixels included in the sensor. The event signal may include identification information of the pixel sensing the change in the amount of light incident on the sensor, and time information of a time at which the change in the amount of light incident on the sensor is sensed. The first sensor and the second sensor may be included in the disparity determination apparatus 100, or included in an apparatus separate from the disparity determination apparatus 100, depending on circumstances. For example, the left sensor 110 and the right sensor 120 of FIG. 1 may be included in the disparity determination apparatus 100.

Each of first sensor and the second sensor may be, for example, an event-based vision sensor. The event-based vision sensor may asynchronously output an event signal by sensing a predetermined event. The event-based vision sensor may include a plurality of event generation elements, and each of the event generation elements may sense a predetermined event, and output an event signal. The event generation elements may be referred to as pixels of the event-based vision sensor.

The predetermined event may include, for example, an event in which an intensity of light incident on the event-based sensor changes. For example, when an event in which light is brightened in a predetermined pixel is sensed, the event-based vision sensor may output an ON event corresponding to the predetermined pixel. When an event in which light is darkened in a predetermined pixel is sensed, the event-based vision sensor may output an OFF event corresponding to the predetermined pixel. Unlike a frame-based vision sensor, the event-based vision sensor may output only pixel data of a portion in which light changes, instead of scanning an output of a photodiode of each pixel in a unit of a frame.

Figure 7:
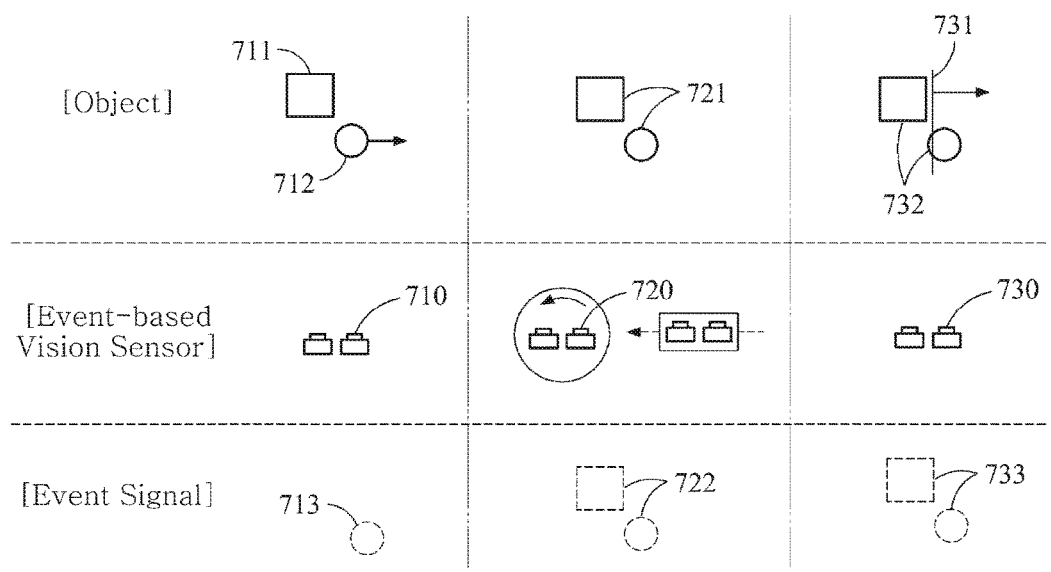
FIG. 7 is a diagram illustrating various examples in which an event occurs according to an exemplary embodiment.

FIG. 7 is a diagram illustrating various examples in which an event occurs according to an exemplary embodiment. Referring to a left portion of FIG. 7, an intensity of light incident on an event-based sensor may change due to a movement of a target object. In an example, when a light source is fixed and a target object does not self-emit light, light emitted from the light source and reflected by the target object may be incident on the event-based vision sensor. In another example, when the target object self-emits light, light emitted from the target object may be incident on the event-based vision sensor.

In an example, when a target object 711 does not move, light reflected by or emitted from the target object 711 in a stationary state may not substantially change. In this example, an intensity of the light incident on an event-based vision sensor 710 may not change. In another example, when a target object 712 moves, light reflected by or emitted from the moving target object 712 changes based on a movement of the target object 712. In this example, the intensity of the light incident on the event-based vision sensor 710 changes. Event signals 713 corresponding to the movement of the target object 712 are generated. Only event generation elements sensing the movement of the target object 712 among a plurality of event generation elements included in the event-based vision sensor 710 may output an event signal.

Referring to a middle portion of FIG. 7, an intensity of light incident on an event-based vision sensor 720 changes due to a movement of the event-based vision sensor 720. For example, when target objects 721 do not move and the event-based vision sensor 720 moves, an intensity of light incident on each of pixels in the event-based vision sensor 720 changes. Accordingly, event signals 722 corresponding to the target objects 721 are generated. When the event-based vision sensor 720 moves, the target objects 721 are sensed as if the target objects 721 move in a direction opposite to a movement direction of the event-based vision sensor 720.

Referring to a right portion of FIG. 7, an intensity of light incident on an event-based vision sensor 730 changes due to a movement of light 731 with a predetermined pattern. For example, when target objects 732 do not move and the light 731 moves, an intensity of light incident on each of pixels in the event-based vision sensor 730 changes. The light 731 may have various shapes, for example, a laser stripe or a fringe pattern, and may move to scan the target objects 732 from left to right. The disparity determination apparatus 100 may further include a light emitter configured to project a moving light pattern. For example, the light emitter may project the light 731 with the predetermined pattern and move the projected light 731. Accordingly, event signals 733 corresponding to the target objects 732 are generated.

Referring again to FIG. 6, each of the first sensor and the second sensor may include a frame-based vision sensor and an output module. The frame-based vision sensor may be configured to capture consecutive images for each frame, and may include, for example, a charge-coupled device (CCD) camera or a complementary metal-oxide-semiconductor (CMOS) camera. The output module may sense an event based on a difference between the consecutive images output from the frame-based vision sensor, and may output an event signal corresponding to the sensed event. For example, the output module may generate difference information of the difference between the consecutive images by comparing the consecutive images. The difference information generated by the output module may correspond to an event signal output from the event-based vision sensor. For example, the output module may detect pixels determined to move between neighboring images by comparing the consecutive images, and may output event signals corresponding to the pixels.

The above description of FIG. 7 is applicable to an example in which each of the first sensor and/or the second sensor includes the frame-based vision sensor and the output module. In the following description, for convenience of description, the first sensor and the second sensor may be event-based vision sensors, and a target object may move. However, exemplary embodiments may variously change.

Referring again to FIG. 6, the extractor 610 extracts a movement direction of an event based on at least one among the output signal of the first sensor and the output signal of the second sensor. In the following description, for convenience of description, a sensor corresponding to a received output signal is called a first sensor. In an example, when an output signal is received from the left sensor 110 of FIG. 1, the left sensor 110 may be called a first sensor. In another example, when an output signal is received from the right sensor 120 of FIG. 1, the right sensor 120 may be called a first sensor. In the examples, a sensor other than the first sensor may be called a second sensor.

Figure 8:
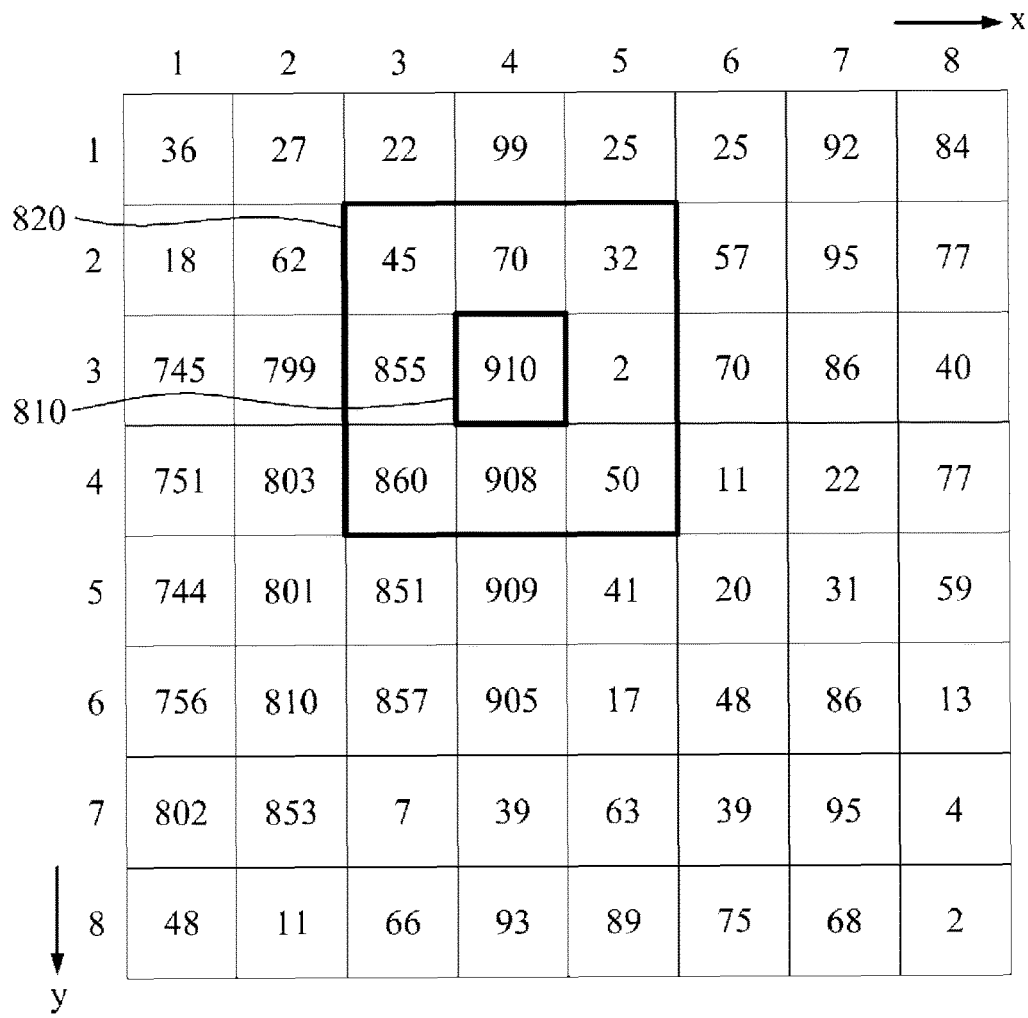
FIG. 8 is a diagram illustrating an example of an event map to explain a method of extracting a movement direction of an event according to an exemplary embodiment.

FIG. 8 is a diagram illustrating an example of an event map to explain a method of extracting a movement direction of an event according to an exemplary embodiment. Referring to FIG. 8, when the output signal of the first sensor is received, the extractor 610 uses a first event map 800 for the first sensor. The output signal of the first sensor may be, for example, an event signal.

The first event map 800 includes elements corresponding to pixels in the first sensor. Each of the elements stores a latest time at which an output signal corresponding to each of the elements is received. For example, referring to FIG. 8, a latest time at which an output signal corresponding to an element located at (4, 4) is received is 908 milliseconds (ms), and a latest time at which an output signal corresponding to an element located at (3, 3) is received is 855 ms. A point in time at which an output signal is received may be referred to as a timestamp or time information.

The disparity determination apparatus 100 may further include an updater. When the output signal of the first sensor is received, the updater may update the first event map 800 based on the output signal. For example, the updater may detect an element corresponding to the output signal among the elements included in the first event map 800, and may update a value stored in the detected element to a timestamp at which the output signal is received. The first event map 800 may store a timestamp of a last received output signal in each of the elements, regardless of a history of output signals received over time.

When the output signal of the first sensor is received, the extractor 610 compares time information of the output signal to time information of elements neighboring an element corresponding to the output signal in the first event map 800. For example, the output signal of the first sensor may include time information indicating an element 810 located at (4, 3). The extractor 610 may compare the time information of the output signal to time information of elements 820 neighboring the element 810 in the first event map 800. The first event map 800 may be updated by the updater in response to the output signal of the first sensor being received and accordingly, the extractor 610 may compare the time information of the element 810 corresponding to the output signal to the time information of the neighboring elements 820.

The extractor 610 extracts a movement direction of an event based on a comparison result. For example, the extractor 610 may compare 910 ms, that is, the time information of the element 810, to 855 ms, that is, time information of the element located at (3, 3) among the neighboring elements 820. The extractor 610 may determine that the time information of the element located at (3, 3) at a left side of the element 810 is updated 55 ms earlier than the time information of the element 810. Based on this determination, the extractor 610 may predict the movement direction of the event as a direction from left to right.

In an example, when a comparison result of comparing the time information of the element 810 to time information of an element among the neighboring elements 820 is greater than or equal to a preset first threshold, the extractor 610 may determine that the time information of the element has no relevance to the element 810, and may not use the comparison result. For example, the extractor 610 may compare 910 ms, that is, the time information of the element 810, to 2 ms, that is, time information of an element located at (5, 3) among the neighboring elements 820. When the first threshold is 150 ms, the extractor 610 may determine that the time information of the element located at (5, 3) that is updated 908 ms earlier than the time information of the element 810, has no relevance to the element 810. In this example, the extractor 610 may not use the time information of the element located at (5, 3) to extract the movement direction of the event.

In another example, when the comparison result of comparing the time information of the element 810 to time information of an element among the neighboring elements 820 is less than a preset second threshold, the extractor 610 may determine that the time information of the element is updated at the same time as the time information of the element 810. For example, the extractor 610 may compare 910 ms, that is, the time information of the element 810, to 908 ms, that is, time information of the element located at (4, 4) among the neighboring elements 820. When the second threshold is 15 ms, the extractor 610 may determine that the time information of the element located at (4, 4) that is updated 2 ms earlier than the time information of the element 810, is updated at substantially the same time as the time information of the element 810.

In this example, the extractor 610 may extract the movement direction of the event based on a result obtained by comparing the time information of the element located at (4, 4) to time information of elements neighboring the element located at (4, 4), as well as the comparison result. For example, the extractor 610 may compare 908 ms, that is, the time information of the element located at (4, 4), to 860 ms, that is, time information of an element located at (3, 4). The extractor 610 may determine that the time information of the element located at (3, 4) at a left side of the element located at (4, 4) is updated 48 ms earlier than the time information of the element located at (4, 4). Based on this determination, the extractor 610 may predict the movement direction of the event as a direction from left to right.

According to an exemplary embodiment, the extractor 610 may compare the time information of the element 810 to time information of a portion of the neighboring elements 820. For example, the extractor 610 may use, as a target for the comparison, a portion of the neighboring elements 820 based on a direction in which sensors are arranged. When the sensors are arranged in an x-axis direction, the element located at (3, 3) and the element located at (5, 3) in the x-axis direction among the neighboring elements 820 may be compared to the element 810.

According to an exemplary embodiment, each of the first threshold and the second threshold may be determined, for example, based on a velocity of an object and a distance traveled by the object. For example, when an object moves at a velocity of about 1 meter per second (m/s) in a distance of 1 meter (m), a time difference between corresponding pixels in a sensor may be about 10 milliseconds (msec). In this example, when a distance between sensors is 25 mm, a pixel time difference between the sensors may be about 25 msec. When the velocity of the object increases, the pixel time difference between the sensors may decrease. When the velocity of the object decreases, the pixel time difference between the sensors may increase. In this example, a first threshold and a second threshold may be set to 100 ms and 1 ms, respectively. Events with a time difference less than or equal to 1 ms as the second threshold may be processed as events occurring at the same time, and events with a time difference greater than or equal to 100 ms as the first threshold may be processed as events irrelevant to each other.

The example in which the output signal of the first sensor is received has been described above; however, there is no limitation thereto. Accordingly, the disparity determination apparatus 100 may similarly operate when the output signal of the second sensor is received. For example, the disparity determination apparatus 100 may manage a second event map for the second sensor, and may extract a movement direction of an event based on the second event map.

According to an exemplary embodiment, it is possible to enhance a reliability and an accuracy of a result of extraction of a movement direction of an event based on a movement direction of neighboring events.

Referring again to FIG. 6, the setter 620 sets corresponding pixels in the first sensor based on the movement direction. The corresponding pixels in the first sensor include pixels that are included in the first sensor and that sense an event corresponding to the same point of the target object at different times. For example, the corresponding pixels in the first sensor may sense a change in light due to the same edge or the same point of the target object at different times. In detail, when the output signal of the first sensor is received, the setter 620 detects a pixel corresponding to the output signal (hereinafter, referred to as a "current pixel"). The setter 620 detects a previous pixel to the current pixel based on the movement direction. The setter 620 sets the previous pixel and the current pixel as the corresponding pixels in the first sensor.

Figure 9:
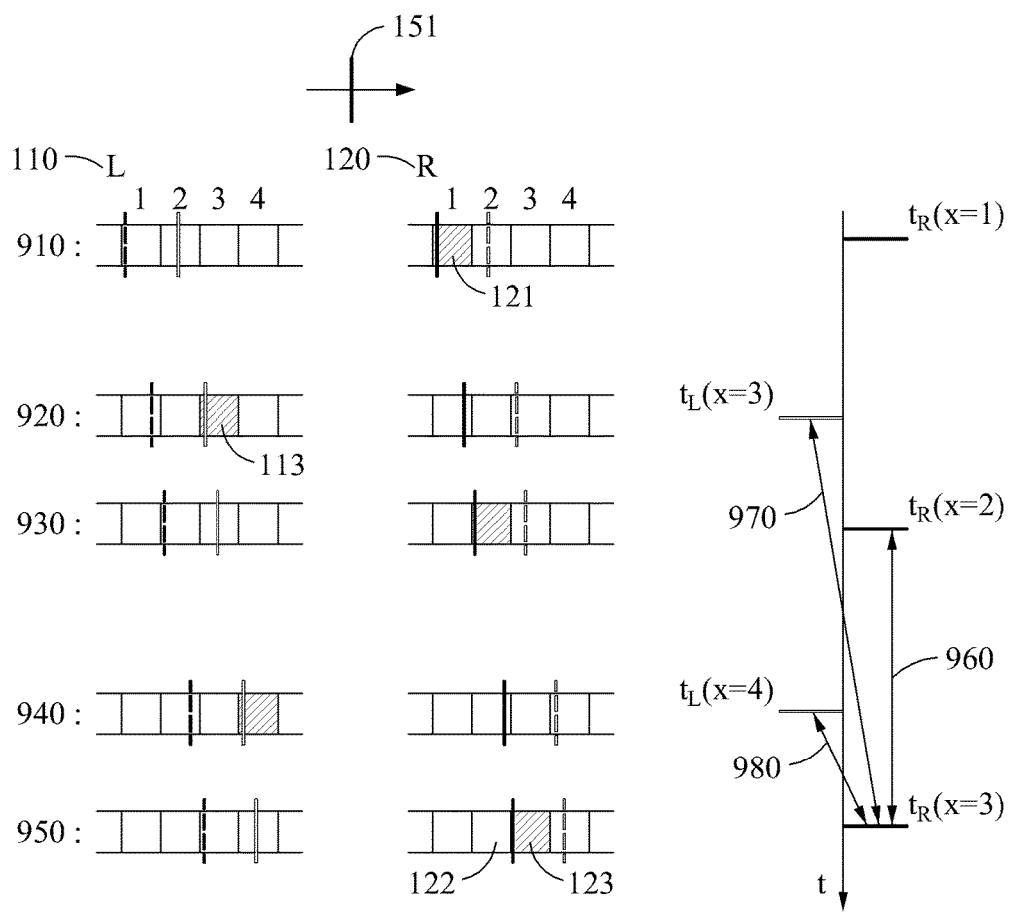
FIG. 9 is a diagram illustrating a method of determining a precise disparity according to an exemplary embodiment.

FIG. 9 is a diagram illustrating a method of determining a precise disparity according to an exemplary embodiment.

Referring to FIG. 9, the left sensor 110 and the right sensor 120 sense the one side 151 of the target object moving from left to right, and may alternately output event signals. Each of pixels in the left sensor 110 and the right sensor 120 output an event signal at a time at which the side 151 is sensed first. For example, when a sum of amounts of light projected onto the pixels changes by a predetermined amount or at least a predetermined ratio, each of the pixels may output an event signal.

The event signal may include a timestamp and information indicating a corresponding pixel. For example, at a time 910, the side 151 is sensed by a first pixel 121 in the right sensor 120. In the right sensor 120 of FIG. 9, a solid line represents a result obtained by the right sensor 120 sensing the side 151, and a dashed line represents a result obtained by the left sensor 110 sensing the side 151. The right sensor 120 may output an event signal including information indicating the first pixel 121 and a timestamp indicating the time 910. The updater may update an event map for the right sensor 120, based on the event signal.

At a time 920, the side 151 is sensed by a third pixel 113 in the left sensor 110. In the left sensor 110 of FIG. 9, a solid line represents a result obtained by the left sensor 110 sensing the side 151, and a dashed line represents a result obtained by the right sensor 120 sensing the side 151. The left sensor 110 may output an event signal including information indicating the third pixel 113 and a timestamp indicating the time 920. The updater may update an event map for the left sensor 110, based on the event signal. Similar operations may be performed at times 930 and 940.

At a time 950, a current pixel is a third pixel 123 in the right sensor 120 corresponding to an event signal output at the time 950. Referring to FIGS. 6 and 9, the extractor 610 receives the event signal from the right sensor 120, and extracts a movement direction of the target object from left to right. The setter 620 determines, as a previous pixel, a second pixel 122 neighboring the current pixel in a direction opposite to the movement direction of the target object. The setter 620 sets the current pixel and the previous pixel as corresponding pixels in the first sensor.

The processor 630 calculates a difference between times at which a movement of the target object is sensed by the corresponding pixels in the first sensor. For example, the processor 630 acquires a time $t_R(x=3)$ of the current pixel and a time $t_R(x=2)$ of the previous pixel from the event map for the right sensor 120, and calculates a difference 960 between the times $t_R(x=3)$ and $t_R(x=2)$.

The setter 620 sets corresponding pixels between the first sensor and the second sensor based on the movement direction. The corresponding pixels between the first sensor and the second sensor include pixels that are included in the first sensor and the second sensor, respectively, and that sense an event corresponding to the same point of the target object. For example, the corresponding pixels between the first sensor and the second sensor may sense a change in light due to the same edge or the same point of the target object at different times or at the same time.

When the corresponding pixels between the first sensor and the second sensor sense an event corresponding to the same point of the target object at the same time, the target object may be determined to be located farther than a predetermined measurable distance. Hereinafter, a description will be given of exemplary embodiments in which the corresponding pixels between the first sensor and the second sensor sense an event corresponding to the same point of the target object at different times.

In an example, the setter 620 may set the corresponding pixels between the first sensor and the second sensor for the processor 630 to calculate a difference between times. In this example, the disparity determination apparatus 100 may further include a determiner. When the output signal of the first sensor is received, the determiner may determine whether the event corresponding to the same point of the target object is already sensed by a pixel that is included in the second sensor and that corresponds to coordinates of a current pixel in the first sensor.

To this end, the determiner may determine whether a movement direction of the event is matched to a virtual direction from a location of the second sensor to a location of the first sensor. For example, when the time 950 is a current time, the current pixel is the third pixel 123 in the right sensor 120 corresponding to the event signal output at the time 950. In this example, the first sensor and the second sensor may be the right sensor 120 and the left sensor 110, respectively. The movement direction of the event may be matched to a virtual direction from the left sensor 110 to the right sensor 120 and accordingly, the determiner may determine that the movement direction of the target object is matched to the virtual direction.

The setter 620 may detect the pixel that is included in the second sensor and that corresponds to the coordinates of the current pixel in the first sensor, based on a determination that the movement direction of the target object is matched to the virtual direction. In the following description, the detected pixel may be referred to as a "coordinate-corresponding pixel." For example, when the current pixel in the first sensor has an x-coordinate of "3," the setter 620 may detect, as a coordinate-corresponding pixel, the third pixel 113 with an x-coordinate of "3" in the second sensor. The setter 620 may set the current pixel and the coordinate-corresponding pixel as the corresponding pixels between the first sensor and the second sensor.

The processor 630 may calculate a difference between times at which a movement of the target object is sensed by the corresponding pixels between the first sensor and the second sensor. For example, the processor 630 may acquire the time $t_R(x=3)$ of the current pixel from the event map for the right sensor 120, may acquire a time $t_L(x=3)$ of the coordinate-corresponding pixel from the event map for the left sensor 110, and may calculate a difference 970 between the times $t_R(x=3)$ and $t_L(x=3)$.

The processor 630 may determine a precise disparity based on a pixel size and a ratio between the differences 960 and 970. For example, the processor 630 may multiply the pixel size by a value obtained by dividing the difference 970 by the difference 960, to determine the precise disparity.

In this example, the processor 630 may determine the precise disparity, instead of needing to use a disparity corresponding to a unit of a predetermined pixel size. The processor 630 may determine a disparity corresponding to a unit of a pixel size, based on the precise disparity. For example, the disparity corresponding to the unit of the pixel size may be utilized to determine a precise disparity for other pixels.

In another example, the setter 620 may set corresponding pixels between the first sensor and the second sensor for the processor 630 to calculate a difference between times, based on, for example, the movement direction, an arrangement of pixels in each of the first sensor and the second sensor, and a disparity corresponding to a unit of a predetermined pixel size.

In an example, the arrangement may refer to an arrangement of first pixels in the first sensor and/or an arrangement of second pixels in the second sensor. In this example, the arrangement may refer to event maps of the first and second sensors.

In another example, the arrangement may refer to a relative arrangement between the first sensor and the second sensor. The arrangement may indicate, for example, whether the first sensor and the second sensor are vertically or horizontally arranged.

A disparity corresponding to a unit of a pixel size may be determined in advance using various schemes. In an example, when a precise disparity is determined based on the pixel size and the ratio between the differences 960 and 970, the disparity corresponding to the unit of the pixel size may be determined by removing digits below a decimal point of the precise disparity. In another example, when the target object is located farther than a predetermined distance, the disparity corresponding to the unit of the pixel size may be determined as "0." In still another example, by tracking a movement direction of an event, a predetermined disparity for existing pixels may be used. In yet another example, the disparity corresponding to the unit of the pixel size may be determined in advance through stereo matching. In a further example, when a reliability of the disparity corresponding to the unit of the pixel size is calculated to be less than a preset threshold reliability, stereo matching may be performed. In this example, stereo matching may be performed between a first image generated based on the output signal of the first sensor and a second image generated based on the output signal of the second sensor.

The setter 620 may detect a pixel in the second sensor from which an event signal is output at a time between a time of the previous pixel and a time of the current pixel in the first sensor, based on the movement direction, the arrangement of the pixels in each of the first sensor and the second sensor, and the disparity corresponding to the unit of the predetermined pixel size. In the following description, the detected pixel may be referred to as a "close-timing pixel." The setter 620 may set the current pixel and the close-timing pixel as the corresponding pixels between the first sensor and the second sensor.

The processor 630 may calculate a difference between times at which a movement of the target object is sensed by the corresponding pixels between the first sensor and the second sensor. For example, the processor 630 may acquire the time $t_R(x=3)$ of the current pixel from the event map for the right sensor 120, may acquire a time $t_L(x=4)$ of the close-timing pixel from the event map for the left sensor 110, and may calculate a difference 980 between the times $t_R(x=3)$ and $t_L(x=4)$.

The processor 630 may determine a precise disparity based on a pixel size, a ratio between the differences 960 and 980, and the disparity corresponding to the unit of the predetermined pixel size. For example, the processor 630 may obtain a sum of the disparity corresponding to the unit of the predetermined pixel size and a value obtained by dividing the difference 980 by the difference 960, and may multiply the sum by the pixel size, to determine the precise disparity.

FIGS. 10 through 14 are diagrams illustrating examples of determining a precise disparity according to exemplary embodiments.

Figure 10:
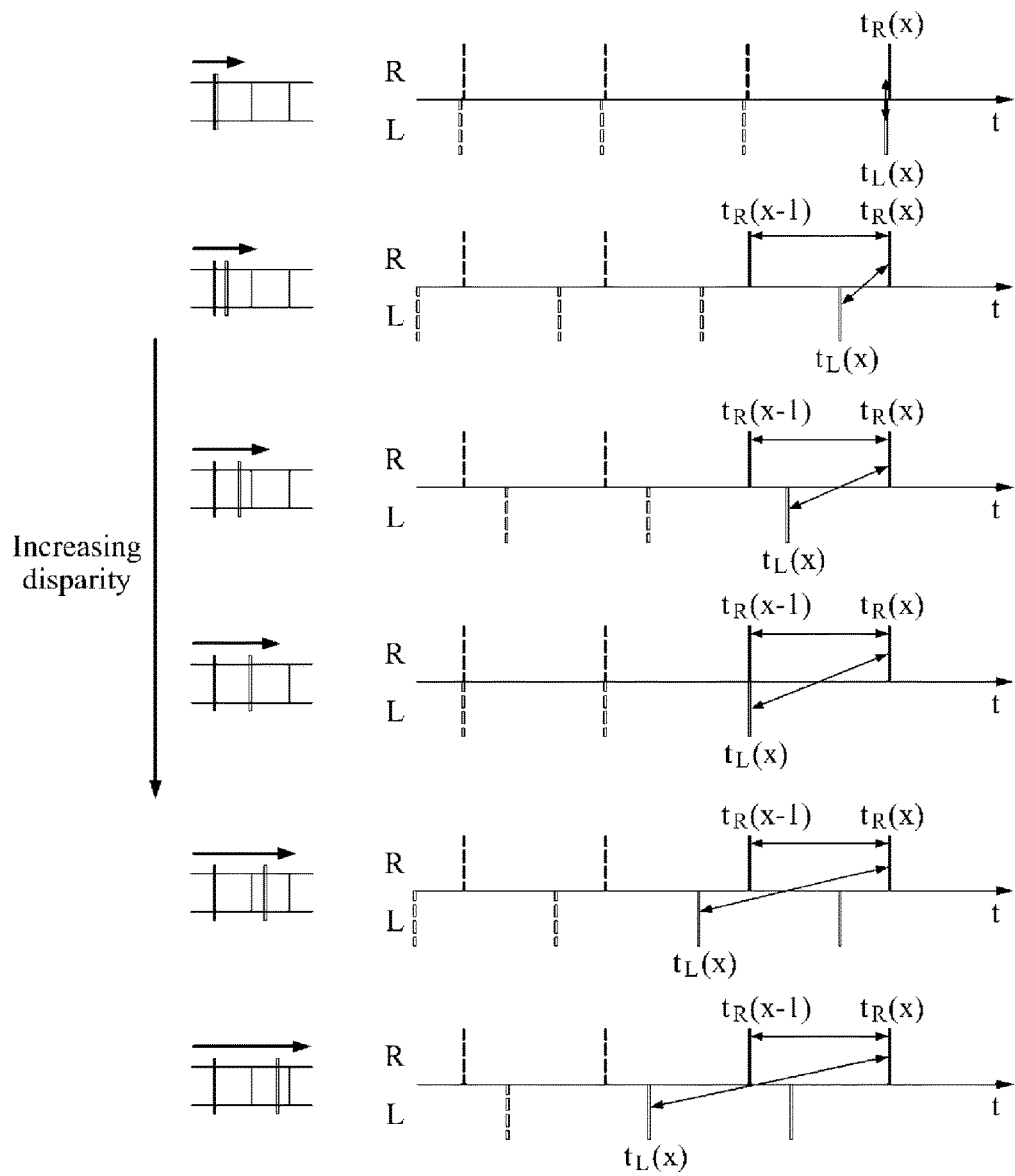
FIGS. 10 through 14 are diagrams illustrating examples of determining a precise disparity according to exemplary embodiments.

FIG. 10 illustrates an example in which a precise disparity is determined at a point in time at which an event signal is output from a right sensor, not using a disparity corresponding to a unit of a predetermined pixel size, when an event moves in a right direction.

The event moving in the right direction may include, for example, an event in which a target object moves from left to right, an event in which a first sensor and a second sensor rotate or move from right to left, or an event in which light with a predetermined pattern is projected while moving from left to right.

When the event moves in the right direction, and when the event signal is output from the right sensor, a pixel included in a left sensor and corresponding to coordinates of a current pixel in the right sensor may be determined to have already sensed the event. In this example, the disparity determination apparatus 100 may calculate the disparity d using Equation 5 shown below. In the following description, the disparity d may be a precise disparity.

$$d \approx \frac{t_R(x) - t_L(x)}{t_R(x) - t_R(x-1)} \delta \qquad \text{[Equation 5]}$$

In Equation 5, $t_R(x)$ denotes a time at which the event is sensed by the current pixel in the right sensor. Because the event moves in the right direction, the disparity determination apparatus 100 may use a coordinate obtained by subtracting "1" from an x-coordinate of the current pixel, to detect a previous pixel in the right sensor. Accordingly, $t_R(x-1)$ denotes a time at which the event is sensed by the previous pixel. The disparity determination apparatus 100 may also detect a coordinate-corresponding pixel included in the left sensor and corresponding to the x-coordinate of the current pixel, instead of using separate stereo matching information. Accordingly, $t_L(x)$ denotes a time at which the event is sensed by the coordinate-corresponding pixel in the left sensor. δ denotes a pixel size.

Figure 11:
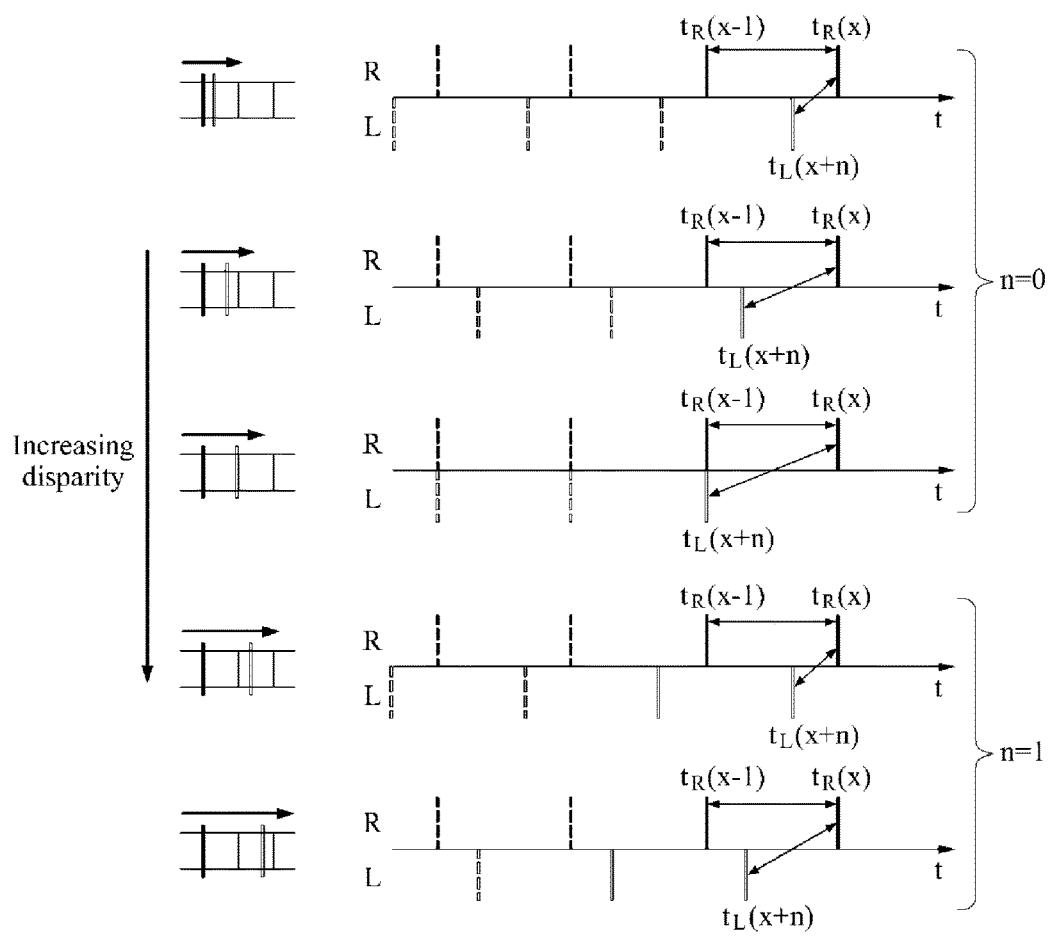

FIG. 11 illustrates an example in which a precise disparity is determined based on a disparity corresponding to a unit of a predetermined pixel size, at a point in time at which an event signal is output from a right sensor, when an event moves in a right direction.

When a disparity corresponding to a unit of a predetermined pixel size is known, the disparity determination apparatus 100 may determine the disparity d using Equation 6 shown below.

$$d \approx \left\{ \frac{t_R(x) - t_L(x+n)}{t_R(x) - t_R(x-1)} + n \right\} \delta \qquad \text{[Equation 6]}$$

In this example, because the event moves in the right direction, a current pixel is included in the right sensor (for example, a movement direction is matched to a virtual direction), and the disparity corresponding to the unit of the predetermined pixel size is denoted by n, the disparity determination apparatus 100 may use a coordinate obtained by adding the disparity n to an x-coordinate of the current pixel, to detect a close-timing pixel that is included in a left sensor and that senses the event at a time between a time of the current pixel and a time of a previous pixel in the right sensor. Accordingly, $t_L(x+n)$ in Equation 6 denotes a time at which the event is sensed by the close-timing pixel in the left sensor.

Figure 12:
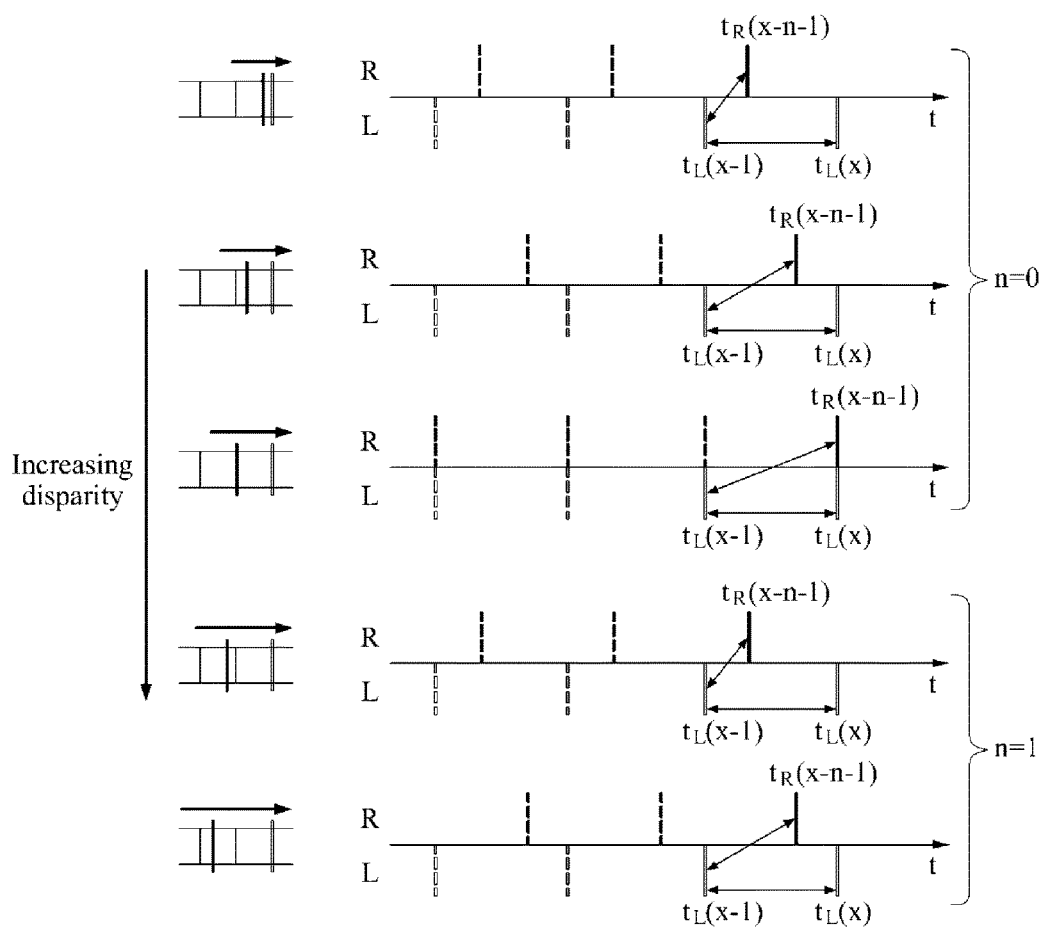

FIG. 12 illustrates an example in which a precise disparity is determined based on a disparity corresponding to a unit of a predetermined pixel size, at a point in time at which an event signal is output from a left sensor, when an event moves in a right direction.

The disparity determination apparatus 100 may determine the disparity d using Equation 7 shown below.

$$d \approx \left\{ \frac{t_R(x-n-1) - t_L(x-1)}{t_L(x) - t_L(x-1)} + n \right\} \delta \qquad \text{[Equation 7]}$$

In Equation 7, $t_L(x)$ denotes a time at which the event is sensed by a current pixel in the left sensor. Because the event moves in the right direction, the disparity determination apparatus 100 may use a coordinate obtained by subtracting "1" from an x-coordinate of the current pixel, to detect a previous pixel in the left sensor. Accordingly, $t_L(x-1)$ denotes a time at which the event is sensed by the previous pixel. Because the event moves in the right direction, the current pixel is included in the left sensor (for example, a movement direction is not matched to a virtual direction), and a disparity corresponding to a unit of a predetermined pixel size is denoted by n, the disparity determination apparatus 100 may use a coordinate obtained by subtracting "(n+1)" from the x-coordinate of the current pixel, to detect a close-timing pixel that is included in a right sensor and that senses the event at a time between a time of the current pixel and a time of the previous pixel. Accordingly, $t_R(x-n-1)$ in Equation 7 denotes a time at which the event is sensed by the close-timing pixel in the right sensor.

Figure 13:
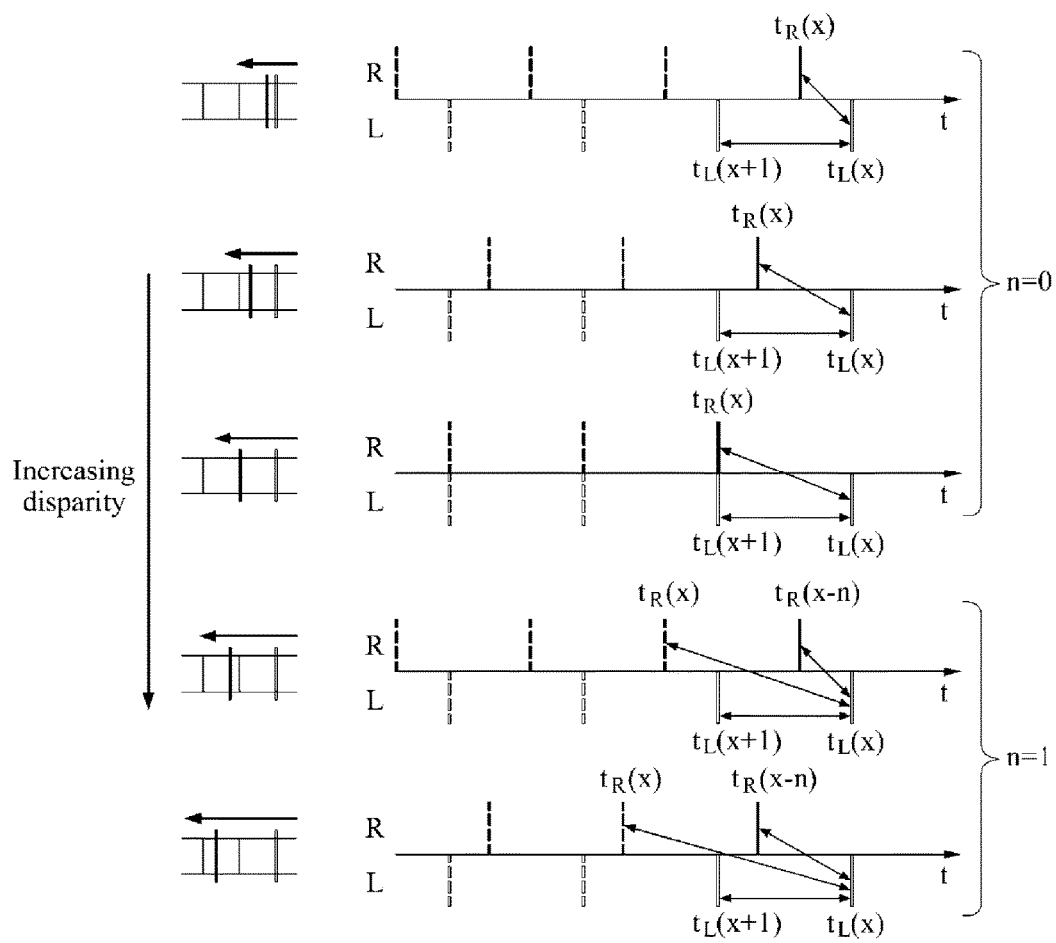

FIG. 13 illustrates an example in which a precise disparity is determined at a point in time at which an event signal is output from a left sensor, when an event moves in a left direction.

The event moving in the left direction may include, for example, an event in which a target object moves from right to left, an event in which a first sensor and a second sensor rotate or move from left to right, or an event in which light with a predetermined pattern is projected while moving from right to left.

When the event moves in the left direction, and when the event signal is output from the left sensor, a pixel included in a right sensor and corresponding to coordinates of a current pixel in the left sensor may be determined to have already sensed the event. In this example, the disparity determination apparatus 100 may calculate the disparity d using Equation 8 shown below.

$$d \approx \frac{t_L(x) - t_R(x)}{t_L(x) - t_L(x+1)} \delta \qquad \text{[Equation 8]}$$

In Equation 8, $t_L(x)$ denotes a time at which the event is sensed by the current pixel in the left sensor. Because the event moves in the left direction, the disparity determination apparatus 100 may use a coordinate obtained by adding "1" to an x-coordinate of the current pixel, to detect a previous pixel in the left sensor. Accordingly, $t_L(x+1)$ denotes a time at which the event is sensed by the previous pixel. The disparity determination apparatus 100 may also detect a coordinate-corresponding pixel included in the right sensor and corresponding to the x-coordinate of the current pixel, instead of using separate stereo matching information. Accordingly, $t_R(x)$ denotes a time at which the event is sensed by the coordinate-corresponding pixel in the right sensor.

When a disparity corresponding to a unit of a predetermined pixel size is known, the disparity determination apparatus 100 may determine the disparity d using Equation 9 shown below.

$$d \approx \left\{ \frac{t_L(x) - t_R(x-n)}{t_L(x) - t_L(x+1)} + n \right\} \delta \quad \text{[Equation 9]}$$

In this example, because the event moves in the left direction, the current pixel is included in the left sensor (for example, a movement direction is matched to a virtual direction), and the disparity corresponding to the unit of the predetermined pixel size is denoted by n, the disparity determination apparatus 100 may use a coordinate obtained by subtracting the disparity n from the x-coordinate of the current pixel, to detect a close-timing pixel that is included in the right sensor and that senses the event at a time between a time of the current pixel and a time of the previous pixel. Accordingly, $t_R(x-n)$ in Equation 9 denotes a time at which the event is sensed by the close-timing pixel in the right sensor.

Figure 14:
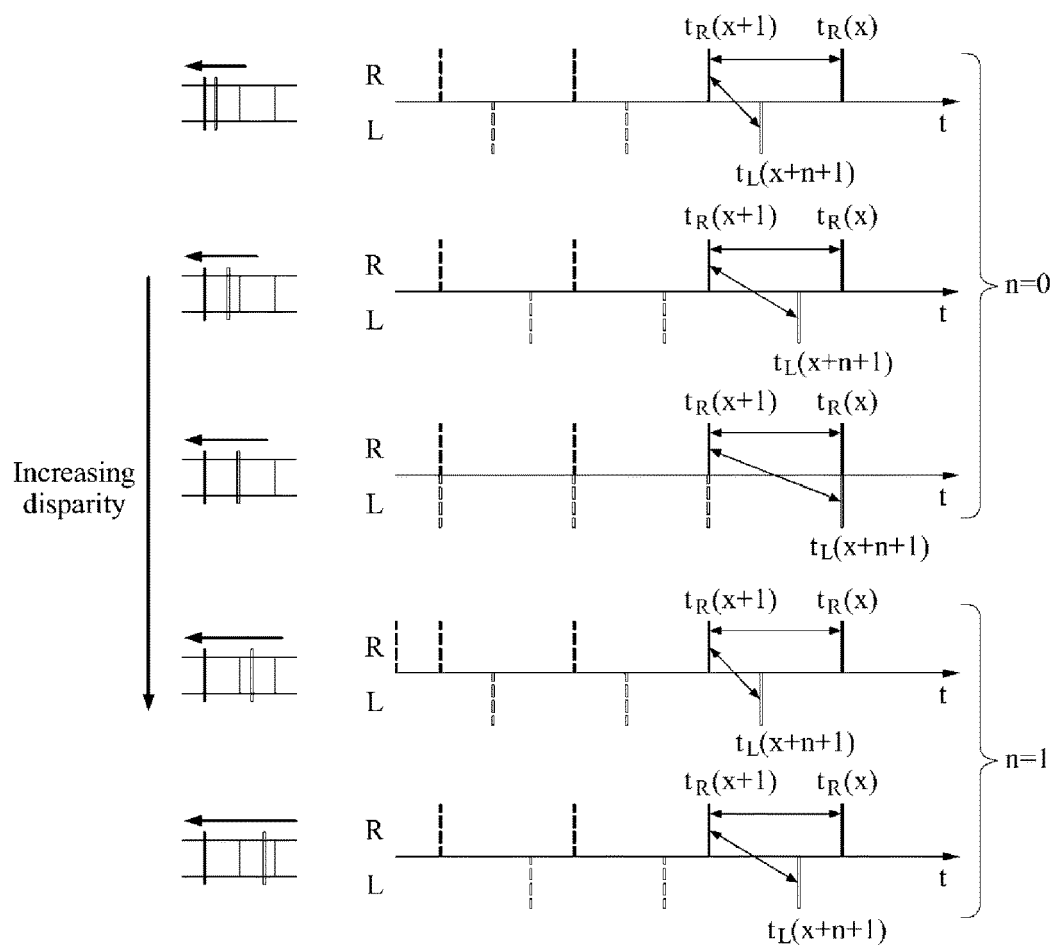

FIG. 14 illustrates an example in which a precise disparity is determined based on a disparity corresponding to a unit of a predetermined pixel size, at a point in time at which an event signal is output from a right sensor, when an event moves in a left direction.

The disparity determination apparatus 100 may determine the disparity d using Equation 10 shown below.

$$d \approx \left\{ \frac{t_L(x+n+1) - t_R(x+1)}{t_R(x) - t_R(x+1)} + n \right\} \delta \quad \text{[Equation 10]}$$

In Equation 10, $t_R(x)$ denotes a time at which the event is sensed by a current pixel in the right sensor. Because the event moves in the left direction, the disparity determination apparatus 100 may use a coordinate obtained by adding "1" to an x-coordinate of the current pixel, to detect a previous pixel in the right sensor. Accordingly, $t_R(x+1)$ denotes a time at which the event is sensed by the previous pixel. Because the event moves in the left direction, the current pixel is included in the right sensor (for example, a movement direction is not matched to a virtual direction), and the disparity corresponding to the unit of the predetermined pixel size is denoted by n, the disparity determination apparatus 100 may use a coordinate obtained by adding "(n+1)" to the x-coordinate of the current pixel, to detect a close-timing pixel that is included in a left sensor and that senses the event at a time between a time of the current pixel and a time of the previous pixel. Accordingly, $t_L(x+n+1)$ denotes a time at which the event is sensed by the close-timing pixel in the left sensor.

Figure 15A:
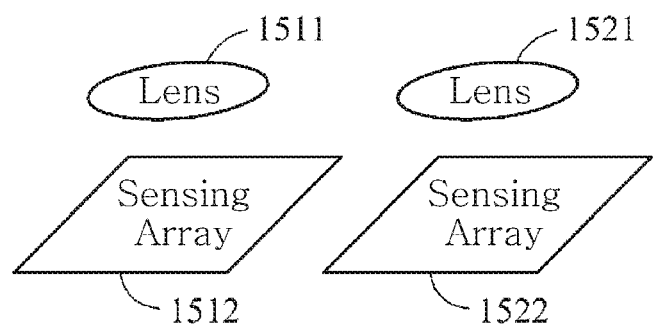
FIGS. 15A through 15D are diagrams illustrating a structure of a plurality of sensors according to exemplary embodiments.
Figure 15B:
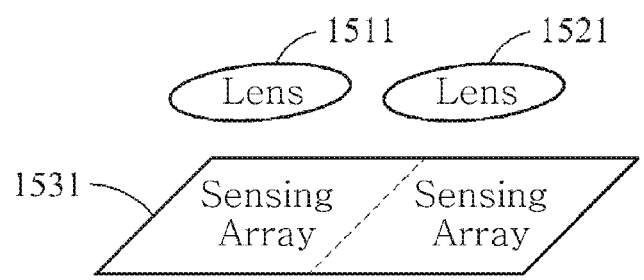
Figure 15C:
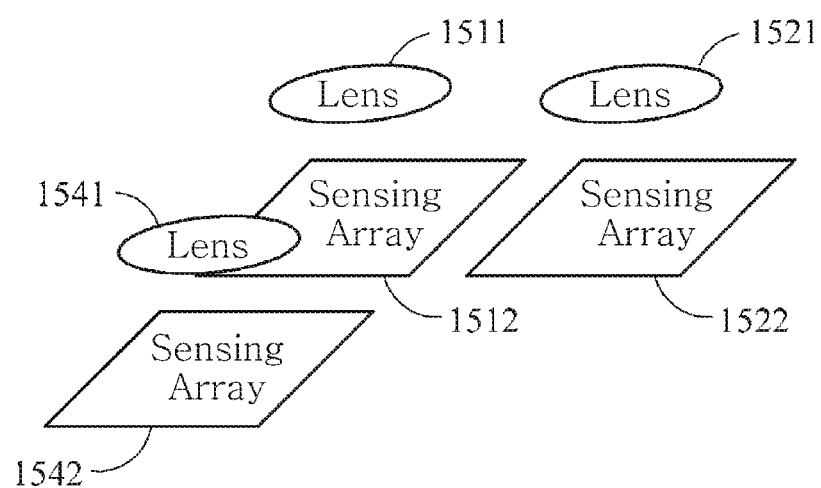

FIGS. 15A through 15D are diagrams illustrating a structure of a plurality of sensors according to exemplary embodiments. Referring to FIG. 15A, a left sensor includes a lens 1511 and a sensing array 1512, and a right sensor includes a lens 1521 and a sensing array 1522. Referring to FIG. 15B, the left sensor and the right sensor use a single sensing array 1531 by logically dividing the sensing array 1531. In FIG. 15B, the left sensor and the right sensor include the lenses 1511 and 1521, respectively.

The examples of calculating the precise disparity at the point in time at which the event signal is output from the left sensor or the right sensor when the event moves in the left direction or the right direction have been described above; however, there is no limitation thereto. Accordingly, the movement direction of the event may be variously changed. In an example, when an event moves in an upper right direction or a lower right direction, the same disparity may be calculated based on a right direction component included in a movement direction of the event. In another example, when an event moves in an upper left direction or a lower left direction, the same disparity may be calculated based on a left direction component included in a movement direction of the event.

For convenience of description, the examples in which the two sensors are located at a right side and a left side have been described; however, there is no limitation thereto. Accordingly, a scheme of arranging the two sensors may be variously changed. For example, the two sensors may be placed in an arbitrary direction.

Figure 15D:
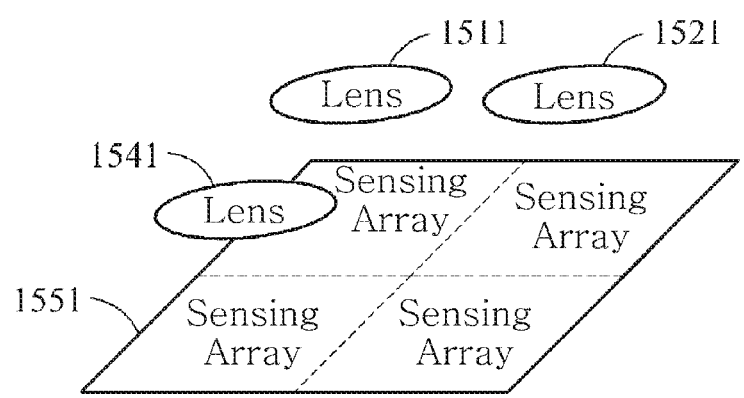

The disparity determination apparatus 100 may calculate a disparity by using a third sensor in addition to the first sensor and the second sensor, even though a left component or a right component in a movement direction of an event does not exist. For example, referring to FIG. 15C, the disparity determination apparatus 100 may use a third sensor in addition to the left sensor and the right sensor, and the third sensor may be located in an orthogonal direction with respect to the left sensor and the right sensor. The third sensor includes a lens 1541 and a sensing array 1542. Referring to FIG. 15D, the left sensor, the right sensor, and the third sensor physically use a single sensing array 1551 by logically dividing the sensing array 1551. In FIG. 15D, the left sensor, the right sensor, and the third sensor include the lenses 1511, 1521 and 1541, respectively. When the third sensor is further used, the same disparity may be calculated based on an upper component and a lower component included in the movement direction of the event.

In an example, at least four sensors may be arranged in different directions. In another example, at least three sensors may be arranged in the same direction. Gaps between the at least three sensors arranged in the same direction may be equal to or different from each other in distance. In this example, a plurality of measurement results for a single direction may be acquired and accordingly, an accuracy of measurement may be enhanced.

In the above-description, an event may move at a constant velocity while being sensed by the corresponding pixels in the first sensor and the corresponding pixels between the first sensor and the second sensor. When an event moves at an increasing velocity, the disparity determination apparatus 100 may still calculate a disparity.

Figure 16:
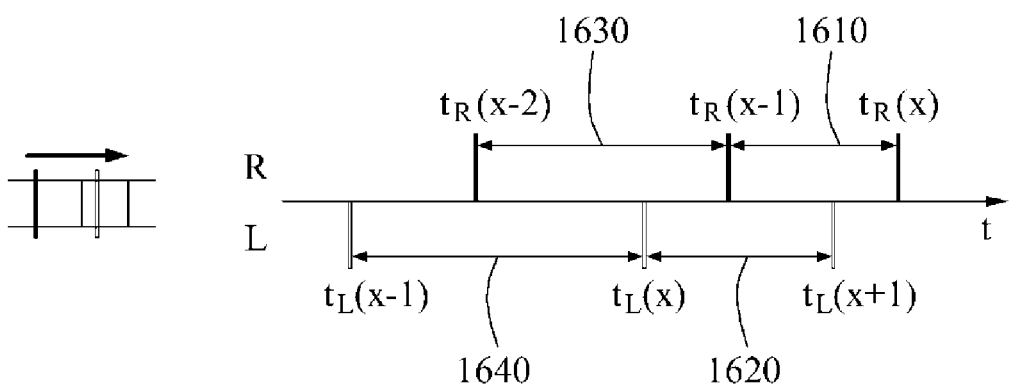
FIG. 16 is a diagram illustrating a method of determining a disparity based on an acceleration of an event according to an exemplary embodiment.

FIG. 16 is a diagram illustrating a method of determining a disparity based on an acceleration of an event according to an exemplary embodiment. Referring to FIG. 16, the disparity determination apparatus 100 may calculate an acceleration of an event based on differences 1610 and 1630 between times $t_R(x-2)$, $t_R(x-1)$, and $t_R(x)$ at which the event is sensed by neighboring pixels in a right lens, and differences 1620 and 1640 between times $t_L(x-1)$, $t_L(x)$, and $t_L(x+1)$ at which the event is sensed by neighboring pixels in a left lens. The disparity determination apparatus 100 may calculate a precise disparity based on the acceleration.

The disparity determination apparatus 100 may directly calculate a disparity using Equation 11, instead of calculating an acceleration and calculating a disparity based on the acceleration. Equation 11 may be used to calculate the disparity when an event moves from left to right and when an event signal is output from a pixel located at an x-coordinate of a right sensor.

$$d = \frac{[\{t_R(x) - t_R(x-1)\} + \{t_L(x) - t_L(x-1)\}]}{\{t_R(x) - t_R(x-1)\}\{t_L(x) - t_L(x-1)\}} \delta$$
$$[\{t_R(x) - t_L(x)\} + \{t_R(x-1) - t_L(x-1)\}]$$

[Equation 11]

Equation 11 may be applied to an event moving without acceleration. In other words, Equation 11 may be obtained based on Equation 5. For example, when an event moves at a constant velocity, "$t_R(x)-t_R(x-1)$" and "$t_L(x)-t_L(x-1)$" may be the same, and "$t_R(x-1)-t_L(x-1)$" and "$t_R(x)-t_L(x)$" may be the same. In this example, Equation 11 may be the same as Equation 5.

The method of calculating a disparity based on latest event times (for example, three times for an event moving at a constant velocity) to reduce a complexity of calculation has been described above; however, there is no limitation thereto. An accuracy may be enhanced by using an event occurring earlier than a latest event or a larger number of events. Additionally, exemplary embodiments may be applicable to an example in which an event moves at an increasing velocity, and an example in which a component of a z-axis direction exists.

Figure 17:
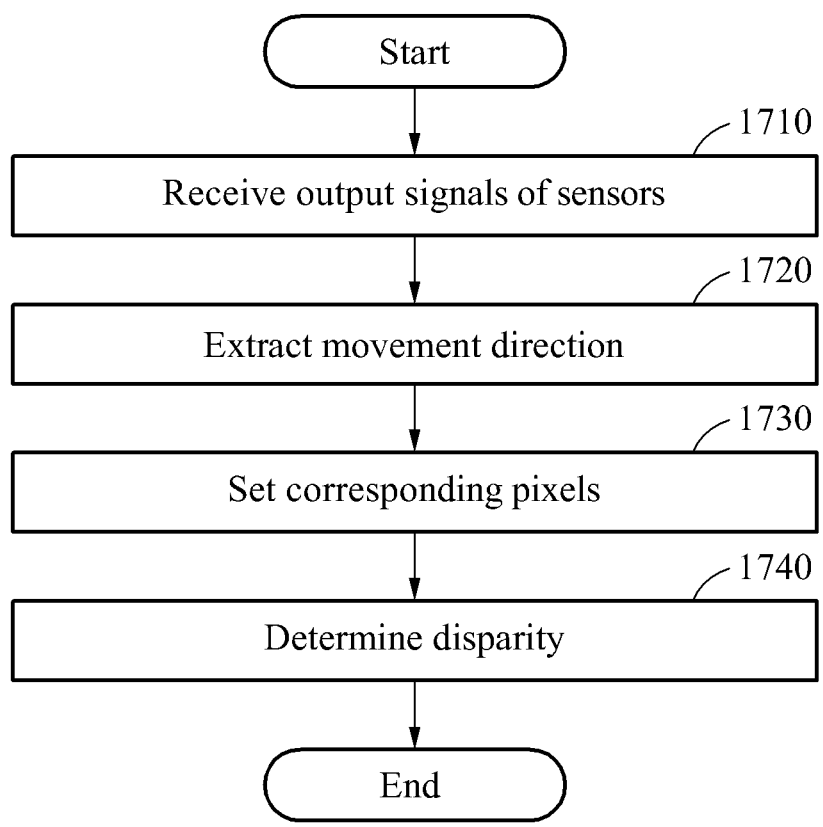
FIG. 17 is a flowchart illustrating a disparity determination method according to an exemplary embodiment.

FIG. 17 is a flowchart illustrating a disparity determination method according to an exemplary embodiment. Referring to FIG. 17, in operation 1710, the disparity determination method receives output signals of a first sensor and a second sensor. The first sensor and the second sensor sense an event at different locations. In operation 1720, the disparity determination method extracts a movement direction of the event based on at least one of the output signals. In operation 1730, the disparity determination method sets corresponding pixels in the first sensor and corresponding pixels between the first sensor and the second sensor, based on the movement direction. In operation 1740, the disparity determination method determines a disparity based on a difference between times at which the event is sensed by the corresponding pixels in the first sensor and a difference between times at which the event is sensed by the corresponding pixels between the first sensor and the second sensor.

The above description of FIGS. 1 through 16 may be directly applicable to operations 1710 to 1740 of FIG. 17 and accordingly, will not be repeated here.

The modules, elements, and methods described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, and any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A disparity determination method of a processing device, the method comprising:
  receiving first signals of an event from a first sensor disposed at a first location and second signals of the event from a second sensor disposed at a second location that is different than the first location;
  extracting a movement direction of the event, based on at least one among the first signals and the second signals;
  determining a disparity between the first sensor and the second sensor, based on the movement direction, a first difference between first times at which the event is sensed by corresponding first pixels in the first sensor, and a second difference between second times at which the event is sensed by corresponding second pixels in the first sensor and the second sensor;
  generating depth information, based on the disparity; and
  outputting the depth information.

2. The disparity determination method of claim 1, wherein a resolution of the disparity is less than a size of pixels in each of the first sensor and the second sensor.

3. The disparity determination method of claim 1, wherein the corresponding first pixels sense the event corresponding to a point of an object at the first times that are different.

4. The disparity determination method of claim 1, further comprising setting, as the corresponding first pixels in the first sensor, a first pixel and a second pixel in the first sensor that sense the event, based on the movement direction.

5. The disparity determination method of claim 1, wherein the extracting comprises:
   comparing a time of an element corresponding to one of the first signals to a time of another element neighboring the element in an event map of the first sensor; and
   extracting the movement direction based on a result of the comparing.

6. The disparity determination method of claim 1, wherein the corresponding second pixels in the first sensor and the second sensor sense the event corresponding to a point of an object at the second times that are different.

7. The disparity determination method of claim 1, further comprising setting, as the corresponding second pixels in the first sensor and the second sensor, a first pixel in the first sensor and a second pixel in the second sensor that sense the event, based on the movement direction, an arrangement of pixels in each of the first sensor and the second sensor, and the disparity having a resolution equal to a size of each of the corresponding second pixels in the first sensor and the second sensor.

8. The disparity determination method of claim 1, further comprising:
   determining whether the movement direction is matched to a virtual direction from the second location of the second sensor to the first location of the first sensor; and
   setting third pixels corresponding to a same coordinate in the first sensor and the second sensor as the corresponding second pixels in the first sensor and the second sensor, in response to the determining that the movement direction is matched to the virtual direction.

9. The disparity determination method of claim 1, wherein a resolution of the disparity is equal to a size of pixels in each of the first sensor and the second sensor.

10. The disparity determination method of claim 1, wherein the determining comprises:
    calculating an acceleration of the event, based on a third difference between third times at which the event is sensed by neighboring third pixels in the first sensor, and a fourth difference between fourth times at which the event is sensed by neighboring fourth pixels in the second sensor; and
    determining the disparity, based on the acceleration, the first difference between the first times at which the event is sensed by the corresponding first pixels in the first sensor, and the second difference between the second times at which the event is sensed by the corresponding second pixels in the first sensor and the second sensor.

11. The disparity determination method of claim 1, wherein the event comprises a same change of light incident on the first sensor being previously detected by the second sensor.

12. The disparity determination method of claim 1, further comprising performing stereo matching between a first image generated based on the first signals and a second image generated based on the second signals, to generate the disparity having a resolution equal to a size of pixels in each of the first sensor and the second sensor.

13. The disparity determination method of claim 1, wherein the determining comprises:
    calculating the first difference between the first times at which the event is sensed by the corresponding first pixels in the first sensor, based on a first event map of the first sensor; and
    calculating the second difference between the second times at which the event is sensed by the corresponding second pixels in the first sensor and the second sensor, based on the first event map and a second event map of the second sensor.

14. The disparity determination method of claim 1, further comprising:
    updating first timestamps of first elements corresponding to the first signals in a first event map of the first sensor, in response to the receiving the first signals; and
    updating second timestamps of second elements corresponding to the second signals in a second event map of the second sensor, in response to the receiving the second signals.

15. A non-transitory computer-readable storage medium storing a program comprising instructions to cause a computer to implement the method of claim 1.

16. A disparity determination apparatus comprising:
    an extractor configured to:
       receive first signals of an event from a first sensor disposed at a first location and second signals of the event from a second sensor disposed at a second location that is different than the first location, and
       extract a movement direction of the event, based on at least one among the first signals and the second signals; and
    a processor configured to:
       determine a disparity between the first sensor and the second sensor, based on the movement direction, a first difference between first times at which the event is sensed by corresponding first pixels in the first sensor, and a second difference between second times at which the event is sensed by corresponding second pixels in the first sensor and the second sensor;
       generate depth information, based on the disparity; and
       outputting the depth information.

17. The disparity determination apparatus of claim 16, wherein at least one among the first sensor and the second sensor comprises an event-based vision sensor configured to:
    sense the event based on a change in incident light; and
    output an event signal of the event that is sensed.

18. The disparity determination apparatus of claim 16, wherein at least one among the first sensor and the second sensor comprises an event-based vision sensor comprising pixels, each of the pixels configured to:
    sense a movement; and
    output an event signal of the movement that is sensed.

19. The disparity determination apparatus of claim 16, wherein at least one among the first sensor and the second sensor comprises:
    a frame-based vision sensor configured to capture consecutive images for each frame; and
    an output module configured to
       sense the event based on a third difference between the consecutive images, and
       output an event signal of the event.

20. The disparity determination apparatus of claim 16, wherein the extractor is further configured to
receive third signals of the event from a third sensor disposed at a third location that is different than the first location and the second location, and
extract the movement direction, based on at least one among the first signals, the second signals, and the third signals, and
the processor is further configured to determine the disparity, based on a third difference between third times at which the event is sensed by corresponding third pixels in the first sensor and the third sensor, the first difference between the first times at which the event is sensed by the corresponding first pixels in the first sensor, and the second difference between the second times at which the event is sensed by the corresponding second pixels in the first sensor and the second sensor.

21. The disparity determination apparatus of claim 16, further comprising a light emitter configured to project a moving light pattern.

22. The disparity determination apparatus of claim 16, further comprising:
a setter configured to set, as the corresponding first pixels in the first sensor, a first pixel and a second pixel in the first sensor that sense the event, based on the movement direction.

23. The disparity determination apparatus of claim 16, wherein the extractor is further configured to:
compare a first time of a first element corresponding to one of the first signals to a second time of a second element neighboring the first element in an event map of the first sensor; and
extract the movement direction based on a result of the first time of the first element being compared to the second time of the second element.

24. The disparity determination apparatus of claim 16, further comprising:
a setter configured to set, as the corresponding second pixels in the first sensor and the second sensor, a first pixel in the first sensor and a second pixel in the second sensor that sense the event, based on the movement direction, an arrangement of pixels in each of the first sensor and the second sensor, and the disparity having a resolution equal to a size of the corresponding second pixels in each of the first sensor and the second sensor.

25. The disparity determination apparatus of claim 16, further comprising:
a determiner configured to determine whether the movement direction is matched to a virtual direction from the second location of the second sensor to the first location of the first sensor; and a setter configured to set pixels corresponding to a same coordinate in the first sensor and the second sensor as the corresponding second pixels in the first sensor and the second sensor, in response to the determiner determining that the movement direction is matched to the virtual direction.

26. The disparity determination apparatus of claim 16, wherein a resolution of the disparity is equal to a size of pixels in each of the first sensor and the second sensor.

27. The disparity determination apparatus of claim 16, wherein the processor is further configured to:
calculate an acceleration of the event, based on a third difference between third times at which the event is sensed by neighboring third pixels in the first sensor, and a fourth difference between fourth times at which the event is sensed by neighboring fourth pixels in the second sensor; and
determine the disparity, based on the acceleration, the first difference between the first times at which the event is sensed by the corresponding first pixels in the first sensor, and the second difference between the second times at which the event is sensed by the corresponding second pixels in the first sensor and the second sensor.

28. The disparity determination apparatus of claim 16, further comprising a matcher configured to perform stereo matching between a first image generated based on the first signals and a second image generated based on the second signals, to generate the disparity having a resolution equal to a size of pixels in each of the first sensor and the second sensor.

29. The disparity determination apparatus of claim 16, wherein the processor is further configured to:
calculate the first difference between the first times at which the event is sensed by the corresponding first pixels in the first sensor, based on a first event map of the first sensor; and
calculate the second difference between the second times at which the event is sensed by the corresponding second pixels in the first sensor and the second sensor, based on the first event map and a second event map of the second sensor.

30. The disparity determination apparatus of claim 16, further comprising an updater configured to:
update first timestamps of first elements corresponding to the first signals in a first event map of the first sensor, in response to the extractor receiving the first signals; and
update second timestamps of second elements corresponding to the second signals in a second event map of the second sensor, in response to the extractor receiving the second signals.

* * * * *